(12) United States Patent
Kim et al.

(10) Patent No.: US 11,163,430 B2
(45) Date of Patent: Nov. 2, 2021

(54) METHOD FOR SELECTING SCREEN ON TOUCH SCREEN BY USING PRESSURE TOUCH

(71) Applicant: HiDeep Inc., Seongnam-si (KR)

(72) Inventors: Seyeob Kim, Seongnam-si (KR); Yun Joung Kim, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

(21) Appl. No.: 16/624,121

(22) PCT Filed: Jun. 22, 2018

(86) PCT No.: PCT/KR2018/007096
§ 371 (c)(1),
(2) Date: Dec. 18, 2019

(87) PCT Pub. No.: WO2019/009545
PCT Pub. Date: Jan. 10, 2019

(65) Prior Publication Data
US 2020/0133467 A1    Apr. 30, 2020

(30) Foreign Application Priority Data
Jul. 4, 2017    (KR) .......................... 10-2017-0084714

(51) Int. Cl.
*G06F 3/0484* (2013.01)
*G06F 3/041* (2006.01)
(Continued)

(52) U.S. Cl.
CPC ........ *G06F 3/04842* (2013.01); *G06F 3/0414* (2013.01); *G06F 3/0485* (2013.01); *G06F 3/04883* (2013.01)

(58) Field of Classification Search
CPC .................................................. G06F 3/04842
See application file for complete search history.

(56) References Cited

U.S. PATENT DOCUMENTS

| 2011/0187750 | A1  | 8/2011 | Ko et al. |
| 2014/0258904 | A1* | 9/2014 | Ku ........................ G06F 3/0485 715/769 |
| 2016/0210013 | A1* | 7/2016 | Park .................... G06F 3/04842 |

FOREIGN PATENT DOCUMENTS

| KR | 10-1103161 B1 | 1/2012 |
| KR | 10-2014-0074498 A | 6/2014 |

(Continued)

OTHER PUBLICATIONS

International Search Report from PCT/KR2018/007096, dated Oct. 1, 2018, pp. 1-12, including English translation.

*Primary Examiner* — Gustavo Polo
(74) *Attorney, Agent, or Firm* — The Belles Group, P.C.

(57) ABSTRACT

A method for selecting a screen on a touch screen using a pressure touch according to the present invention includes a first pressure touch sensing step for sensing a first pressure touch having a pressure of a prescribed magnitude or higher, which is input through a touch screen, a scroll operation sensing step for sensing a scroll operation input through the touch screen, a display step for scrolling and displaying a screen displayed on the touch screen according to the scroll operation, a second pressure touch sensing step for sensing a second pressure touch having a pressure of a prescribed magnitude or higher, which is input on the scrolled screen, and a selection area setting step for setting, as a selection area, an area defined by a position at which the first pressure touch is sensed and a position at which the second pressure touch is sensed.

16 Claims, 21 Drawing Sheets

(51) Int. Cl.
*G06F 3/0485* (2013.01)
*G06F 3/0488* (2013.01)

(56) References Cited

FOREIGN PATENT DOCUMENTS

| KR | 10-2015-0046579 A | 4/2015 |
| KR | 10-2015-0065122 A | 6/2015 |
| KR | 10-2015-0111233 A | 10/2015 |

\* cited by examiner

DRAWINGS

METHOD FOR SELECTING SCREEN ON TOUCH SCREEN BY USING PRESSURE TOUCH

CROSS-REFERENCE TO RELATED PATENT APPLICATIONS

The present application is a U.S. national stage application under 35 U.S.C. § 371 of PCT Application No. PCT/KR2018/007096, filed Jun. 22, 2018, which claims priority to Korean Patent Application No. 10-2017-0084714, filed Jul. 4, 2017. The disclosures of the aforementioned priority applications are incorporated herein by reference in their entireties.

TECHNICAL FIELD

The present invention relates to a screen selection method on a touch screen using a pressure touch, and more particularly, to a screen selection method on a touch screen, in which a screen on the touch screen may be easily selected on the basis of a touch having a pressure, and the selected screen may be captured, deleted, or transmitted, etc.

BACKGROUND ART

Various kinds of input devices including a button, a key, a joystick, a touch screen, and the like for operating a computing system are under development and used. Among them, the touch screen has various advantages such as ease of operation, miniaturization of products, simplification of manufacturing processes and the like, and attracts a lot of attention.

A touch screen may compose a touch surface of a touch input device including a touch sensor panel. The touch sensor panel may be attached to the front surface of the touch screen to cover the touch screen. A user may touch the touch screen through a finger to operate the device. The device detects the presence or absence of a touch of the user touches and the touch position, and performs a calculation to execute an action corresponding to the user operation.

Most of the devices (e.g. a mobile terminal, and a PDA, etc.) adopting touch screens determine the presence or absence of a touch of a user and the touch position to execute a specific operation. In detail, the user touches an area in which an application is displayed, a corresponding device detects the touched position and executes, drives, or ends the application. Each device may also operate an application on the basis of a touch time, the number of touches, or a touch pattern. For example, an object displayed through a long touch, double touches, multiple touches, or the like may be operated in various types.

However, the aforementioned existing touch control type performs a specific operation on the basis of a touch position, a touch pattern, or a touch time, and thus a controllable operation is limited. At the current time at which functions of various kinds of devices are integrated and the functions are also diversified day by day, a new touch type is required which breaks away from the existing touch control type.

However, it is not only easy to implement a new touch type while reproducing the existing touch control type, but it is also difficult to detect together a touch in an existing type and a touch in a new type.

DISCLOSURE

Technical Problem

The purpose of the present invention is to provide a device capable of executing various kinds of applications using a new touch type based on a touch pressure. In particular, the purpose of the present invention is to provide a screen selection method on a touch screen, in which a screen displayed on a mobile terminal is easily selected using a scroll operation or a drag operation, and the selected screen may be captured, deleted, or transmitted, etc.

Technical Solution

In order to accomplish the above purpose, an embodiment of the present invention provide a method for selecting a screen on a touch screen using a pressure touch, including: a first pressure touch sensing step for sensing a first pressure touch having a pressure of a prescribed magnitude or higher, which is input through a touch screen; a scroll operation sensing step for sensing a scroll operation input through the touch screen; a display step for scrolling and displaying a screen displayed on the touch screen according to the scroll operation; a second pressure touch sensing step for sensing a second pressure touch having a pressure of a prescribed magnitude or higher, which is input on the scrolled screen; and a selection area setting step for setting, as a selection area, an area defined by a position at which the first pressure touch is sensed and a position at which the second pressure touch is sensed.

The method for selecting a screen on a touch screen using a pressure touch may further include, after the selection area setting step, an image capturing step for capturing an image included in the selection area.

In the image capturing step, the image included in the selection area may be captured at a time when the second pressure touch has a pressure of a preset magnitude or higher.

In the image capturing step, when the second pressure touch is released, the image included in the selection area may be captured.

In the image capturing step, after the second pressure touch is released, a touch input on the touch screen may be sensed to capture the image included in the selection area.

In the image capturing step, after the second pressure touch is released, a third pressure touch of a prescribed magnitude or higher, which is input on the touch screen, may be sensed to capture the image included in the selection area.

The screen selection method using a pressure touch may further include: a selection area modifying step for changing a range of the selection area between the selection area setting step and the image capturing step.

In the image capturing step, while the second pressure touch is applied, a touch input on the touch screen may be sensed to capture the image included in the selection area.

In the image capturing step, while the second pressure touch is applied, a fourth pressure touch of a prescribed magnitude or higher may be sensed to capture the image included in the selection area.

In the image capturing step, after the second pressure touch is sensed, when the second pressure touch has a pressure magnitude smaller than a prescribed magnitude, the image included in the selection area may be captured.

The screen selection method using a pressure touch may further include: a selection area modifying step for changing a position at which the second pressure touch is applied to change a range of the selection area between the selection area setting step and the image capturing step.

The scroll operation may be a drag operation input on the touch screen.

In the selection area setting step, an area defined as a quadrangle with a position at which the first pressure touch is sensed and a point at which the second pressure touch is sensed taken as vertices in a diagonal direction may be set as the selection area.

In another embodiment of the present invention, a method for selecting a screen on a touch screen using a pressure touch, includes: a first pressure touch sensing step for sensing a first pressure touch having a pressure of a prescribed magnitude or higher, which is input through a touch screen; a drag operation sensing step for sensing a drag operation input through the touch screen; a display step for moving, according to the drag operation, a screen displayed on the touch screen in up and down directions or in left and right directions to display the moved screen; a second pressure touch sensing step for sensing a second pressure touch having a pressure of a prescribed magnitude or higher, which is input on the scrolled screen; and a selection area setting step for setting, as a selection area, an area defined by a position at which the first pressure touch is pressed and a position at which the second pressure touch is sensed.

The method for selecting a screen on a touch screen using a pressure touch may further include: after the selection area setting step, an image capturing step for capturing an image included in the selection area.

The drag operation may be a drag operation using a tap touch input on the touch screen or a drag operation using a pressure touch input on the touch screen.

In another embodiment of the present invention, a method for selecting a screen on a touch screen using a pressure touch, includes: a first pressure touch sensing step for sensing a first pressure touch having a pressure of a prescribed magnitude or higher, which is input through a touch screen; a drag operation sensing step for sensing a drag operation input through the touch screen; a display step for displaying an area having an arbitrary shape on the touch screen according to the drag operation; a second pressure touch sensing step for sensing a second pressure touch having a pressure of a prescribed magnitude or higher, which is input at a position corresponding to a position at which the first pressure touch is applied; and a selection area setting step for setting, as a selection area, an area having an arbitrary shape displayed on the touch screen.

The method for selecting a screen on a touch screen using a pressure touch may further include: after the selection area setting step, an image capturing step for capturing an image included in the selection area.

The drag operation may be a drag operation using a tap touch input on the touch screen or a drag operation using a pressure touch input on the touch screen.

In another embodiment of the present invention, a method for selecting a screen on a touch screen using a pressure touch, includes: a pressure touch sensing step for sensing a pressure touch having a pressure of a prescribed magnitude or higher, which is input through a touch screen; a display step for displaying an arbitrary area enlarged or reduced around a position at which the pressure touch is applied, as a pressure magnitude of the pressure touch is changed; and a selection area setting step for confirming and setting, as a selection area, the arbitrary area displayed on the touch screen.

The method for selecting a screen on a touch screen using a pressure touch may further include: after the selection area setting step, an image capturing step for capturing an image included in the selection area.

In the selection area setting step, the pressure touch on the touch screen may be released to confirm and set the arbitrary area as the selection area.

In the image capturing step, the pressure touch on the touch screen may be released to capture the image in the selection area, or after the pressure touch on the touch screen is released, a separate touch may be applied on the touch screen to capture the image in the selection area.

Advantageous Effects

According to the screen selection method on a touch screen using a pressure touch, a screen displayed on a device such as a mobile terminal may be easily selected through a scroll operation or a drag operation, and the selected screen may be captured, deleted, or transmitted, etc.

MODE FOR INVENTION

Figure 1:
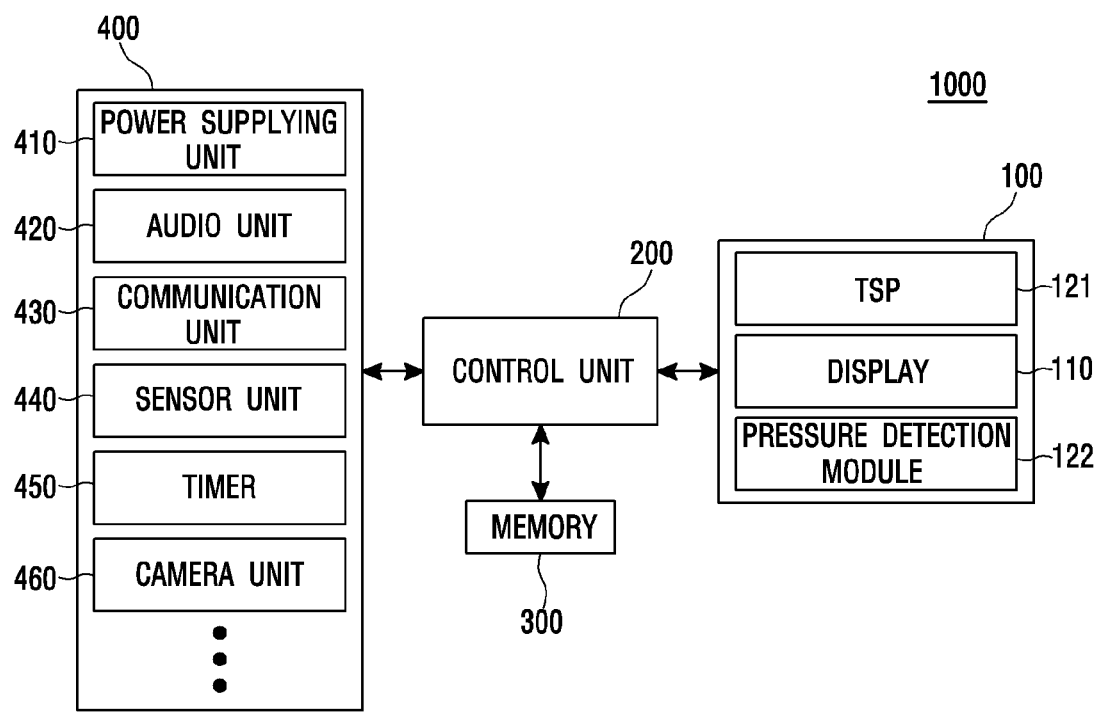
FIG. 1 is a block diagram illustrating a configuration of a device according to the present invention.

Advantages and features of the present invention, and methods for achieving the same will be cleared with reference to exemplary embodiments described later in detail together with the accompanying drawings. However, the present invention is not limited to the following exemplary embodiments, but realized in various forms. In other words, the present exemplary embodiments are provided just to complete disclosure the present invention and make a person having an ordinary skill in the art understand the scope of the invention. The present invention should be defined by only the scope of the accompanying claims.

Also, though terms like a first, a second or the like are used to describe various members or components, the members or components are not limited to these terms. These terms are used only to differentiate one member or components from another member or other components. Therefore, a first member or a first component referred to below can be referred to as a second member or a second component within technical spirit of the present invention.

The terminology used herein is for the purpose of describing particular embodiments only and is not intended to limit the scope of the present disclosure. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the invention belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings. In the present document, same reference numerals on drawings are used to designate same elements throughout the drawings and repeated descriptions of the same components will be omitted. A detailed description about specific embodiments illustrated in the accompanying drawings is to be read in association with the accompanying drawings, which are considered as a part of the entire description. Referring to direction or directivity is merely for the purpose of convenience of description and is not intended to limit the scope of the present invention.

Hereinafter, a device including a touch screen according to an exemplary embodiment of the present invention and a screen selection method on the touch screen will be described with reference to the accompanying drawings. The device to be described in the present specification may include a mobile phone, a smartphone, a laptop computer, a digital broadcast terminal, a personal digital assistant (PDA), a navigator, a slate PC, a tablet PC, an ultrabook, a wearable device, a KIOSK, or the like, which is provided with a touch screen.

Configuration of Device 1000

FIG. 1 is a block diagram illustrating a configuration of a device 1000 according to the present invention. As illustrated in FIG. 1, the device 1000 according to the present invention includes a touch screen 100, a control unit 200, a memory 300 and other units 400. The other units 400 may include a power supplying unit 410, an audio unit 420, a communication unit 430, a sensor unit 440, a timer 450, a camera unit 460, and the like so as to perform basic functions and maintain the performance of the device 1000 according to the present invention.

The touch screen 100 includes a display 110, a touch sensor panel 121 and a pressure detection module 122 to function as a display means and an input means. Here, the function as the input means is to sense a user's touch on the surface (e.g. a polarizer etc. of a touch sensor panel or a display panel) of the touch screen 100, and to perform various operations (e.g. execution of an application, a voice/video call, or the like) on the basis of touch information.

The touch information includes 2D touch information and 3D touch information. The 2D touch information may be detected by a touch sensor panel 121, and the 3D touch information may be detected by a pressure detection module 122.

The 2D touch information means information about whether a touch is input (presence or absence of a touch), or which position on a touch screen surface the touch is input (touch position). The 3D touch information means information about the pressure (force) of a touch applied to the surface of the touch screen 100. In other words, the 3D touch information may be information about a touch having the pressure enough to bend the touch screen surface at a user's touch position. However, in another embodiment, the 3D touch may mean a touch having the pressure that may be sensed by a separate pressure sensor without bending of the touch screen surface.

The structures, functions and operations of the display 110, the touch sensor panel 121 and the pressure detection module 122 included in the touch screen 100 will be described below in more detail.

The memory 200 has a function of storing various pieces of information required for operation of the device 1000, or storing a photograph/a moving image file imaged by camera unit 460 or a screen image generated by capturing a screen. The image stored in the memory 300 may be controlled to be displayed through the touch screen 100 on the basis of a user operation signal.

The control unit 300 controls the touch screen 100, the memory 200 and the other units 600 to perform prescribed operations on the basis of a user operation (command) input through the touch screen 100. The control by means of the control unit 300 will be described below in detail with specific embodiments.

As an extra configuration, the other units 400 may include the power supplying unit 410 for supplying power for operating each component, the audio unit 420 related to an input and output of a voice and sound, the communication unit 430 for performing voice communication with a communication terminal or data communication with a server, the sensor unit 440 including a sensing unit such as a gyro sensor, an acceleration sensor, a proximity sensor, or a magnetic sensor, and the timer 450 for checking a call time or touch duration. However, the aforementioned components may be omitted, or replaced, or another component may be further added thereto, as necessary.

Structure of Touch Screen 100

Figure 2:
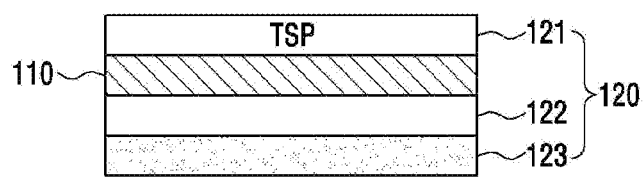
FIG. 2 illustrates a layered structure of a touch screen of a device according to the present invention.

FIG. 2 shows a layered structure of the touch screen 100 of the device 1000 according to the present invention. As illustrated in FIG. 2, the touch screen 100 of the device 1000 according to the present invention includes the touch sensor panel 121, the display 100, the pressure detection module 122 and a substrate 123. In FIG. 2, the touch sensor panel 121, the pressure detection module 122, and the substrate 123 compose a touch input unit 120 for receiving a user's touch.

The display 110 has a function of displaying a text, an image (still image, dynamic image, or 3D image, etc.), a color and the like.

The touch sensor panel 121 detects information about a 2D touch. The 2D touch, as a term corresponding to a 3D touch to be described later, indicates a touch performed by a simple contact or a touch having a pressure of a prescribed magnitude or smaller. In detail, the 2D touch may mean a touch having the force not enough to bend the touch screen or a touch having the force not enough to be recognized as a pressure by a separate pressure sensor.

In other words, the information about the 2D touch means information about whether the touch screen surface is touched, or information about positions or the number of times of touches on the touch screen surface, a moving direction of a touch, or the like.

The pressure detection module 122 detects information about the 3D touch. The 3D touch, as a term corresponding to the 2D touch, means a touch having a pressure of a prescribed magnitude or larger. In detail, the 3D touch may mean a touch having the force enough to bend the touch screen, or having the force enough to be recognized, by a separate pressure sensor, that a pressure is applied.

In other words, the information about the 3D touch means information about the magnitude or a change thereof, or the duration of the 3D touch or the like.

The substrate 123 may be a reference potential layer used for detecting the 3D touch. In FIG. 2, the reference potential layer is disposed under the pressure detection module 122, but may be disposed on the pressure detection module 122, or positioned inside the display 110 in another embodiment.

In addition, in FIG. 2, one reference potential layer (i.e. substrate 123) is illustrated, but two or more reference potential layers may be used in another embodiment. Where the pressure detection module 122 is disposed or how many of the pressure detection module 122 is adopted may be suitably changed as necessary.

2D Touch Detection

Figure 3A:
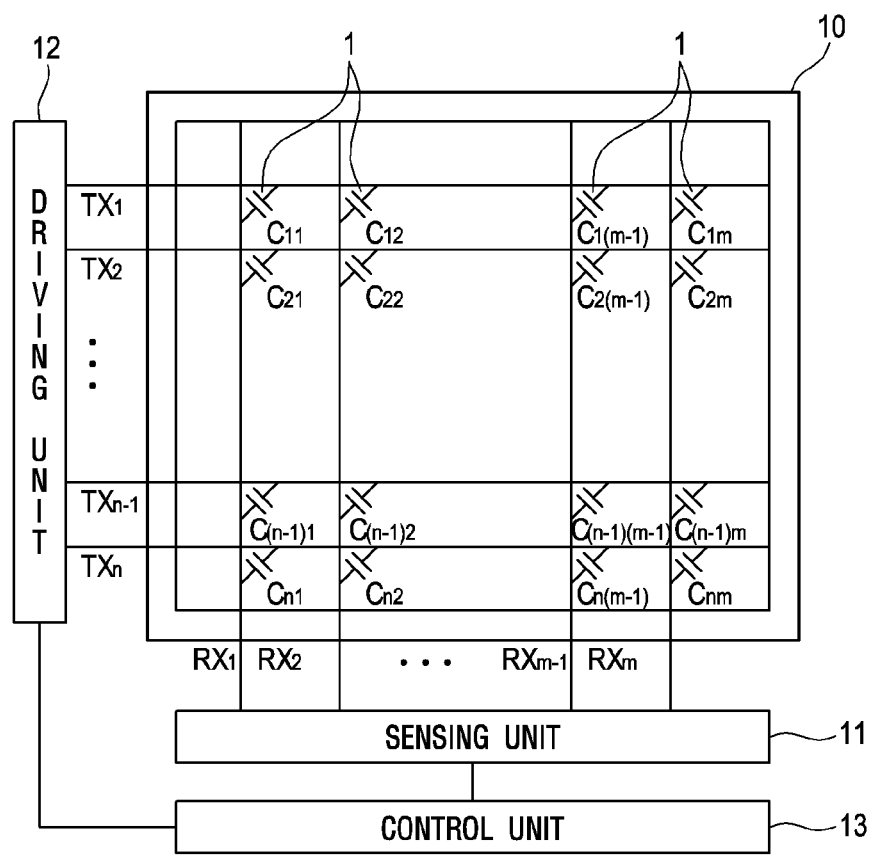
FIGS. 3A and 3B are drawings for explaining the structure and an operation of a touch sensor panel included in a touch screen of a device according to the present invention.
Figure 3B:
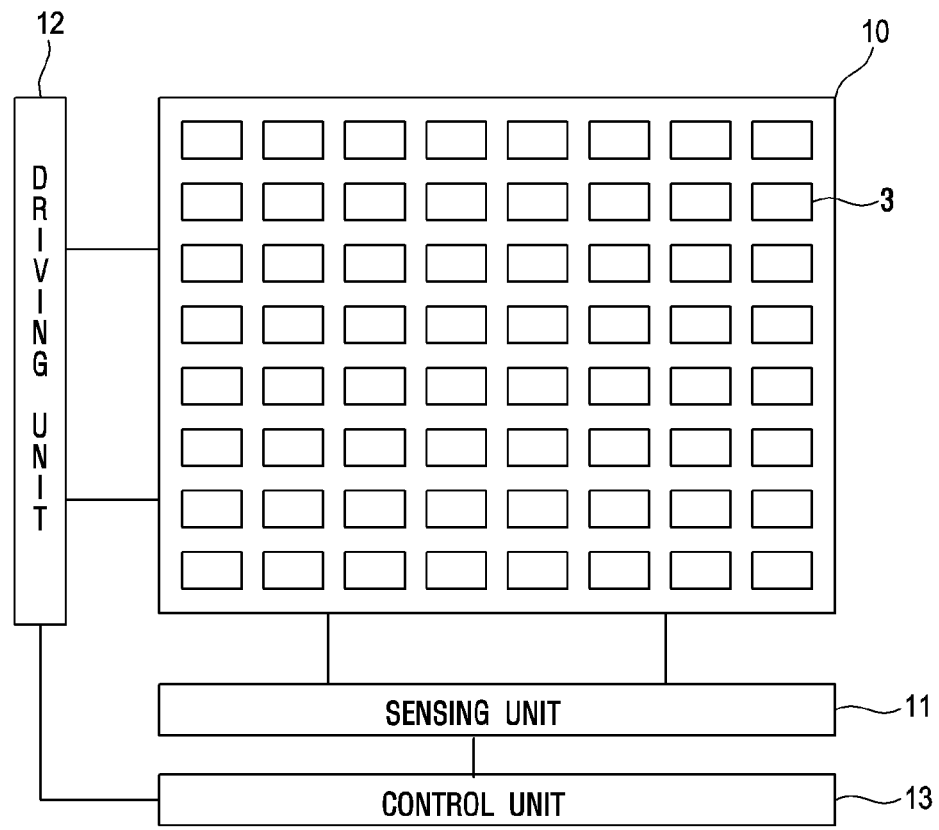

FIGS. 3A and 3B illustrate the structure and operation of the touch sensor panel 121 included in the touch screen 100 of the device 1000 according to the present invention.

FIG. 3A is a schematic diagram for describing the touch sensor panel 121 in a mutual capacitance type and the operation thereof. Referring to FIG. 3A, the touch sensor panel 121 includes a plurality of driving electrodes TX1 to TXn and a plurality of receiving electrodes RX1 to RXm, and may also include a driving unit 12 which applies driving signals to the plurality of driving electrodes TX1 to TXn for operating the touch sensor panel 121, and a sensing unit 11 which receives sensing signals including information about change amounts in the capacitance that is changed according to a touch for the touch surface of the touch sensor panel 121, and detects a touch and a touch position.

As illustrated in FIG. 3A, the touch sensor panel 121 may include the plurality of driving electrodes TX1 to TXn and the plurality of receiving electrodes RX1 to RXm. In FIG. 3A, the plurality of driving electrodes TX1 to TXn are illustrated to compose an orthogonal array with the plurality of receiving electrodes RX1 to RXm, but, in another embodiment, they may compose an array of another pattern.

The driving electrodes TX may include a plurality of driving electrodes TX1 to TXn extending in a first axial direction, and the receiving electrodes RX may include the plurality of receiving electrodes RX1 to RXm extending in a second axial direction that intersects with the first axial direction.

The plurality of driving electrodes TX1 to TXn and the plurality of receiving electrodes RX1 to RXm may be formed on the same layer. For example, the plurality of driving electrodes TX1 to TXn and the plurality of receiving electrodes RX1 to RXm may be formed on the same surface of an insulation film (not shown). Alternatively, the plurality of driving electrodes TX1 to TXn and the plurality of receiving electrodes RX1 to RXm may be formed on different layers. For example, the plurality of driving electrodes TX1 to TXn and the plurality of receiving electrodes RX1 to RXm may be respectively formed on both surfaces of one insulation film (not shown), or the plurality of driving electrodes TX1 to TXn may be formed on one surface of a first insulation layer (not shown) and the plurality of receiving electrodes RX1 to RXm may be formed on one surface of a second insulation layer (not shown) that is different from the first insulation layer.

The plurality of driving electrodes TX1 to TXn and the plurality of receiving electrodes RX1 to RXm may be formed from a transparent conductive material (for example, indium tin oxide (ITO) or antimony tin oxide (ATO) formed from tin oxide ($SnO_2$) and indium oxide ($In_2O_3$)), etc. However, this is merely exemplary, and the plurality of driving electrodes TX1 to TXn and the plurality of receiving electrodes RX1 to RXm may also be formed from another transparent conductive material or an opaque conductive material. For example, the driving electrodes TX and the receiving electrodes RX may be formed from a material including at least any one among silver ink, copper, or carbon nanotube (CNT). In addition, the driving electrodes TX and the receiving electrodes RX may be formed from a metal mesh material or a nano silver material.

The driving unit 12 may apply a driving signal to the driving electrodes TX1 to TXn. The driving signal may be sequentially applied to one driving electrode at a time from a first driving electrode TX1 to an nth driving electrode TXn. Such an application of the driving signal may be repeatedly performed. This is merely exemplary, and driving signals may be simultaneously applied to the plurality of driving electrodes according to an embodiment.

The sensing unit 11 may detect presence or absence of a touch and a touch position by receiving, through the receiving electrodes RX1 to RXm, sensing signals including information about capacitance $C_{m:1}$ generated between the driving electrodes TX1 to TXn to which the driving signals are applied and the receiving electrodes RX1 to RXm. For example, the sensing signals may be signals that the driving signals applied to the driving electrodes TX are coupled with the capacitance $C_{M:1}$ generated between the driving electrodes TX and the receiving electrodes RX. In this way, a process for sensing the driving signals applied from the first driving electrode TX1 to the nth driving electrode TXn through the receiving electrodes RX1 to RXm may be referred to as scanning of the touch sensor panel 100.

For example, the sensing unit 110 may be composed by including a receiver (not shown) connected to the receiving electrodes RX1 to RXm through respective switches. The switches may be turned on in a time period when the signals from the receiving electrodes RX are respectively sensed, and may cause the sensing signals from the receiving electrodes RX to be sensed by the receiver. The receiver may be composed by including an amplifier (not shown) and a feedback capacitor coupled to a feedback path between a negative (−) input terminal and an output terminal of the amplifier. Here, a positive (+) input terminal of the amplifier may be connected to the ground.

In addition, the receiver may further include a reset switch connected in parallel to the feedback capacitor. The reset switch may reset conversion from a current to a voltage, which is performed by the receiver. The negative input terminal of the amplifier may be connected to a corresponding receiving electrode RX, and a current signal including information about the capacitance CM:1 may be received, amplified and then converted to the voltage. The sensing unit 11 may further include an analog-to-digital converter (ADC, not shown) for converting data integrated through the receiver into digital data. Thereafter, the digital data may be input to a processor (not shown) and processed to acquire touch information about the touch sensor panel 121. The sensing unit 11 may be composed by including the ADC and the processor together with the receiver.

The control unit 13 may perform a function for controlling operations of the driving unit 12 and the detection unit 11. For example, the control unit 13 may generate a driving control signal and then deliver the driving control signal to the driving unit 12 so that a driving signal may be applied to a preset driving electrode TX at a prescribed time. In addition, the control unit 13 may generate a sensing control signal and then deliver the sensing control signal to the sensing unit 11 so that the sensing unit 11 receive a sensing signal from a preset receiving electrode RX to perform a preset function.

In FIG. 3A the driving unit 12 and the sensing unit 11 may compose a touch detection device (not shown) that may detect presence or absence of a touch and a touch position on the touch screen 100 in the device 1000 according to the present invention, and the touch detection device may further include a control unit 13. The touch detection device may be integrated and implemented on a touch sensing integrated circuit (IC), which is a touch sensing circuit in the device 1000 including the touch sensor panel 121. The driving electrodes TX and the receiving electrodes RX included in the touch sensor panel 100 may be connected to the driving unit 12 and the sensing unit 11 included in the touch sensing IC (not shown) through, for example, a conductive trace and/or a conductive pattern printed on the circuit board, etc. The touch sensing IC may be positioned on a circuit board, for example, a first printed circuit board (hereinafter, a first PCB) on which the conductive pattern is printed. According to an embodiment, the touch sensing IC may be mounted on a main board for operating the device 1000.

As aforementioned above, capacitance Cm, 1 of a prescribed value is generated at each intersection point of the driving electrodes TX and the receiving electrodes RX, and an object U such as a finger, a palm, or a stylus is close to the touch sensor panel 121, the value of the capacitance may be changed.

The capacitance in FIG. 3A may represent mutual capacitance Cm. The sensing unit 11 may sense such electrical characteristics and sense presence or absence of a touch and/or the touch position on the touch sensor panel 121. For example, the presence or absence of a touch and/or the touch position on the surface of the touch sensor panel 121 may be sensed, wherein the touch sensor panel is formed from a two-dimensional plane having a first axis and a second axis.

More specifically, when a touch occurs on the touch sensor panel 121, the position on the second axial direction of the touch may be detected by detecting a driving electrode TX to which a driving signal is applied. Similarly, when a touch occurs on the touch sensor panel 121, the position on a first axial direction of the touch may be detected by detecting a change in capacitance from a receiving signal received through the receiving electrode RX.

In the above, the touch sensor panel 121 is described to determine the presence or absence of a touch or a touch position on the basis of a change amount in the mutual capacitance Cm between the driving electrodes TX and the receiving electrodes RX, but the operation type is not limited thereto. As shown in FIG. 3B, it is also possible that the touch position is sensed on the basis of a change amount in self capacitance.

As shown in FIG. 3B, the touch sensor panel 121 may be provided with a plurality of touch electrodes 3. As shown in FIG. 3A, the plurality of touch electrodes 3 may be arranged in a lattice shape with a certain space therebetween, but are not limited thereto.

The driving control signal generated by the control unit 13 is delivered to the driving unit 12, and the driving unit 12 may apply the driving signal to a preset touch electrode 3 at a prescribed time on the basis of the driving control signal. In addition, the sensing control signal generated by the control unit 13 is delivered to the sensing unit 11, and the sensing unit 11 may receive the sensing signal from a preset touch electrode 3 at a prescribed time on the basis of the sensing control signal. Here, the sensing signal may be a signal for a change amount in the self capacitance formed at the touch electrode 3.

Here, the presence or absence or the touch and/or the touch position for the touch sensor panel 121 are detected by means of the sensing signal sensed by the sensing unit 11. For example, since the coordinates of the touch electrode 3 is already known, the presence or absence or the touch and/or the touch position of the object U on the surface of the touch sensor panel 121 may be sensed.

Descriptions about the touch sensor panel 121 in which the presence or absence or the touch and/or the touch position are detected on the basis of the change amount in the mutual capacitance Cm and the change amount in the self capacitance Cs are provided with reference to FIGS. 3A and 3B. But arbitrary touch sensing types other than the above-described may also be adopted including a surface capacitance type, a projected capacitance type, a resistive type, a surface acoustic wave (SAW) type, an infrared type, an optical imaging type, a dispersive signal type, an acoustic pulse recognition type, or the like.

Structure of Display

Figure 4A:
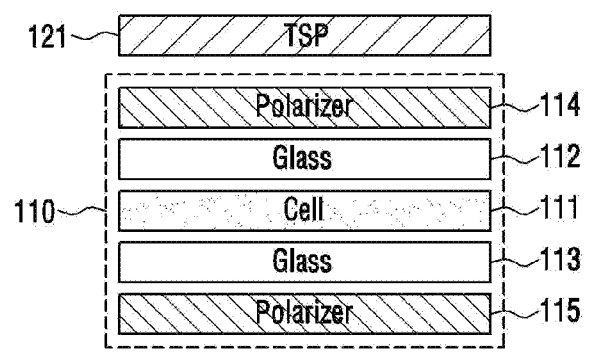
FIGS. 4A to 4E are drawings illustrating the structure of a display included in a touch screen of a device according to the present invention.
Figure 4B:
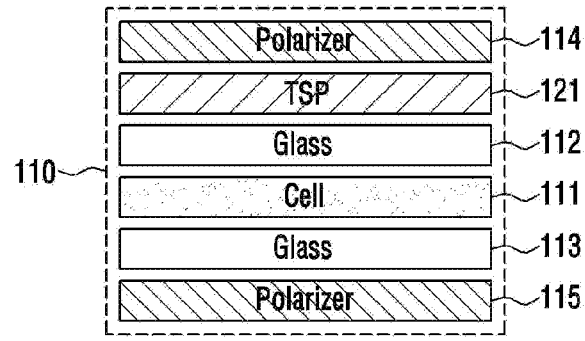
Figure 4C:
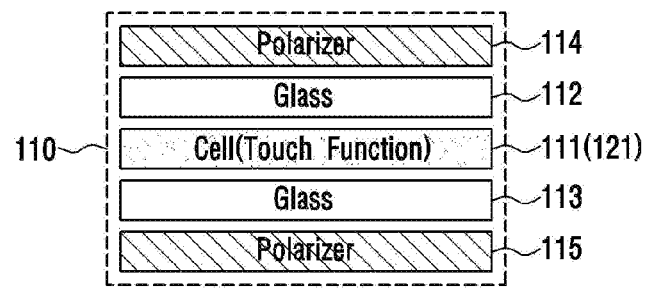
Figure 4D:
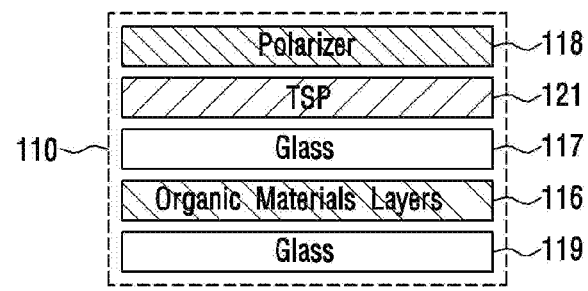

FIGS. 4A to 4E are drawings showing the structure of the display 110 included in the touch screen 100 of the device 1000 according to the present invention, and illustrate various layered structures of the display 110 and the touch sensor panel 121 of FIG. 2. In detail, FIGS. 4A to 4C illustrate examples of the display 110 using an LCD panel, and FIGS. 4D and 4D illustrate examples of the display 110 using an OLED panel.

As shown in FIGS. 4A to 4C, the LCD panel may include a liquid crystal layer 111 including a liquid crystal cell, a first glass layer 112 and a second glass layer 113 including electrodes at both ends of the liquid crystal layer 111, a first polarization layer 114 on one side of the first glass layer 112 in a direction facing the liquid crystal layer 111, and a second polarization layer 115 on one side of the second glass layer 113. Here, the first glass layer 112 may be a color filter glass, and the second glass layer 113 may be TFT glass. It may be obvious for a person skilled in the art that the LCD panel may further include another component and may be changed in order to perform a display function.

In FIG. 4A, the touch sensor panel 121 is disposed outside the display 110. Here, the surface of the device 1000, on which a touch is performed, will be a surface of the touch sensor panel 121. In detail, the user's touch may be performed on an upper surface of the touch sensor panel 121. In addition, a touch surface of the device 1000 may be an outer surface of the display 110 according to an embodiment. In FIG. 4A, the outer surface of the display 110, which may be a touch surface, may be the bottom surface of the second polarization layer 115 of the display 110. Here, in order to protect the display 110, the bottom surface of the display 110 may be covered with a cover layer (not shown) such as glass.

In FIGS. 4B and 4C, the touch sensor panel 121 is disposed inside the display panel 110. In FIG. 4B, the touch sensor panel 121 for detecting the touch position is disposed between the first glass layer 112 and the first polarization layer 114. Here, the touch surface of the device 1000 is an outer surface of the display 110, and may be the top surface or the bottom surface of the layered structure illustrated in FIG. 4B.

In FIG. 4C, the touch sensor panel 121 for detecting the touch position is included within the liquid crystal layer 111. Here, the touch surface of the device 1000 is an outer surface of the display 110, and may be the top surface or the bottom surface of the layered structure illustrated in FIG. 4C. In FIGS. 4B and 4C, the top surface or the bottom surface of the display 110, which may be the touch surface, may be covered with a cover layer (not shown) such as glass.

Figure 4E:
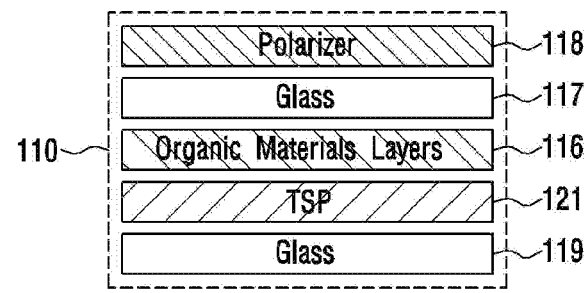

As shown in FIGS. 4D and 4E, the OLED panel includes a polarization layer 118, the first glass layer 117, an organic material layer 116 and a second glass layer 119. Here, the first glass layer 117 is an encapsulation glass, and the second glass layer 119 may be a TFT glass, but are not limited thereto.

In addition, the organic material layer 116 may include a hole injection layer (HIL), a hole transfer layer (HTL), an emission material layer (EIL), an electron transfer layer (ETL), and an electron injection layer (EML). The HIL is used for injecting a hole and uses a material such as CuPc. The HTL performs a function of moving the injected hole, and mainly uses a material having a high hole mobility. The HTL may use arylamine, TPD, or the like. The EIL and ETL are layers for injecting and transporting electrons, and the injected electrons and holes are combined to emit light in the EML. The EML is composed of a host, which is a material for representing the color of the emitted light and determines the life of an organic material, and a dopant for determining the color or the efficiency. This merely explains a basic configuration of the organic material layer 280 included in the OLED panel, and the present invention is not limited to the layered structure, the material or the like of the organic material layer 116 of the present invention.

The organic material layer 116 is inserted between an anode (not shown) and a cathode (not shown), and when the TFT is turned on, a driving current is applied to the anode so as to inject a hole thereto and inject an electron to the cathode. The hole and the electron are moved to the organic material layer 116 to emit light.

In FIG. 4D, the touch sensor panel 121 is positioned between the polarization layer 118 and the first glass layer 117, and, in FIG. 4E, the touch sensor panel 121 is positioned between the organic material layer 116 and the second glass layer 119.

The first glass layer 117 may be formed from encapsulation glass and the second glass layer 119 may be formed from TFT glass.

The OLED panel is a self-emissive display panel based on the principle that when a current is flowed to a fluorescent or phosphorescent organic material thin film, an electron and a hole are combined in the organic material layer to emit light, and the organic material forming the light emission layer determines the color of the light.

In detail, the OLED is based on the principle that when an organic material is spread on glass or plastics and the electricity is flowed to, the organic material emits light. In other words, when a hole and an electron are respectively injected to a positive electrode and a negative electrode so as to recombine them in the light emission layer, an exciton in a high energy state is generated, and, when the exciton falls to a lower energy state, the energy is dissipated to emit light at a specific wavelength. Here, the color of the light is changed according to the organic material of the light emission layer.

In the OLED, there are a passive-matrix organic light-emitting diode (PM-OLED) in a line driving type and an active-matrix organic light-emitting diode (AM-OLED) in an individual driving type according to operation characteristics of pixels forming the pixel matrix. Since both types do not require backlight, they are advantageous in that a display may be implemented very thinly, a contrast ratio is constant according to an angle, and a color reproduction according to a temperature is good. In addition, it is very economical in that a non-driven pixel does not consume power.

In terms of operation, the PM-OLED emits light during a scanning time with a high current, and the AM-OLED maintains a light emission state during a frame time with a low current. Accordingly, the AM-OLED has a better resolution and lower power consumption than the PM-OLED, and is advantageous in driving a large-area display panel. In addition, since the AM-OLED may have a thin film transistor (TFT) therein and individually control each element, it is easy to implement a delicate screen.

3D Touch Detection

FIGS. 5A to 5D and FIGS. 6A to 6C illustrate operation and detection types of the pressure detection module 122 of the device 1000 according to the present invention.

FIGS. 5A to 5D illustrate a type in which the pressure detection module 122 detects presence or absence of a 3D touch and/or touch magnitude on the basis of mutual capacitance between pressure electrodes.

Figure 5A:
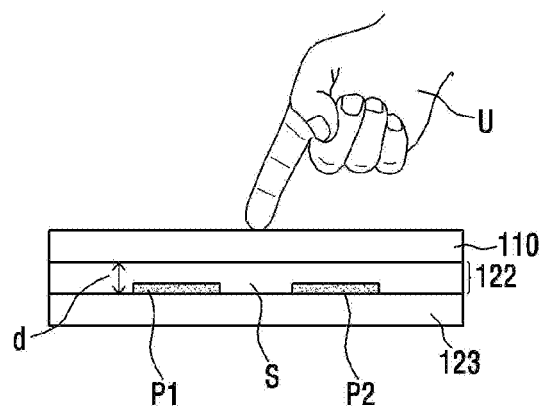
FIGS. 5A to 5D are drawings illustrating operation and detection types of a pressure detection module of the device according to the present invention.

As shown in FIG. 5A, a spacer layer S may be positioned between the display 110 and the substrate 123. Pressure electrodes P1 and P2 disposed according to an embodiment shown in FIG. 5A may be disposed in a side of the substrate 300.

The pressure detection module 122 may include a first electrode P1 and a second electrode P2 as pressure electrodes for detecting a pressure. Here, any one between the first electrode P1 and the second electrode P2 may be a driving electrode and the other may be a receiving electrode. A driving signal is applied to the driving electrode to acquire a sensing signal through the receiving electrode. When a voltage is applied, mutual capacitance $C_m$ is generate between the first electrode P1 and the second electrode P2.

Figure 5B:
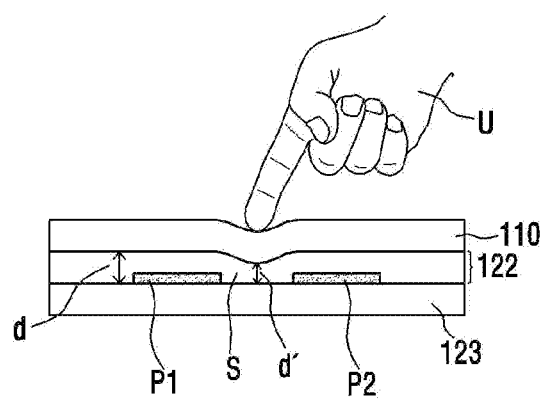

FIG. 5B illustrates a case in which a 3D touch, namely, a touch having a pressure is applied to a touch screen 100 illustrated in FIG. 5A. The bottom surface of the display 110 may have a ground potential for shielding a noise. When a 3D touch having a pressure of a prescribed magnitude or larger is applied to the surface of the touch screen 100 through an object U, the touch sensor panel 121 and the display 110 may be bent. Accordingly, the distance between the ground potential surface and the two pressure electrodes P1 and P2 is reduced from d to d'. Therefore, fringing capacitance is absorbed to the bottom surface of the display 110, and thus the mutual capacitance between the first electrode P1 and the second electrode P2 is reduced. By means of this, a reduction amount in the mutual capacitance is acquired from the sensing signal acquired through the receiving electrode to calculate the magnitude of the touch pressure.

Figure 5C:
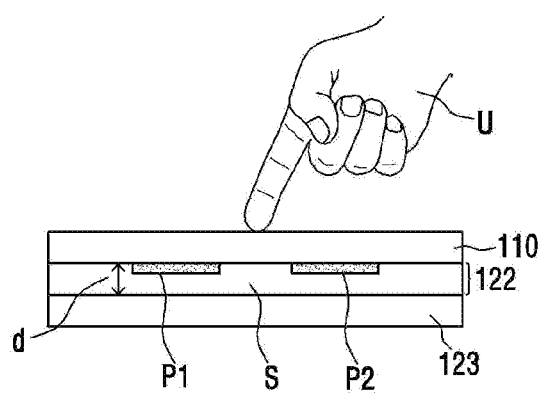

FIG. 5C illustrates the configuration of the pressure detection module 122 according to another embodiment. In the electrode disposition shown in FIG. 5C, the pressure electrodes P1 and P2 are positioned between the display 110 and the substrate 123, and are disposed in a side of the display 110.

The substrate 123 may be a reference potential layer and have the ground potential. Accordingly, as the 3D touch is performed, the distance between the substrate 123 and the pressure electrodes P1 and P2 is reduced from d to d' and as a result, the mutual capacitance between the first electrode P1 and the second electrode P2 is changed.

Figure 5D:
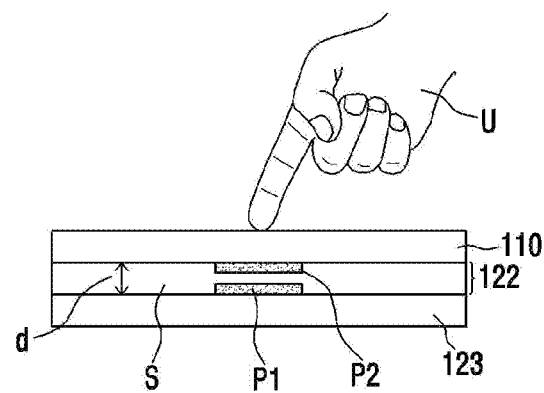

FIG. 5D illustrates the configuration of the pressure detection module 122 according to another embodiment. As shown in FIG. 5D, any one between the first electrode P1 and the second electrode P2 is formed on the substrate 1123, and the other is formed on the bottom portion of the display 110. FIG. 5D exemplarily illustrates that the first electrode P1 is formed on the substrate 123 and the second electrode P2 is formed on the bottom portion of the display 110. Not to mention, the positions of the first electrode P1 and the second electrode P2 may be changed.

In the structure of FIG. 5D, the principle is the same as the above-described. In other words, when the 3D touch is applied to the surface of the touch screen 100 through the object U, bending occurs, the distance d between the first electrode P1 and the second electrode P2 is reduced, and as the distance d is reduced to d', the mutual capacitance between the first electrode P1 and the second electrode P2 is changed. Accordingly, a reduction amount in the mutual capacitance is acquired from the sensing signal, which is acquired through the receiving electrode, to calculate the magnitude of the touch pressure.

Figure 6A:
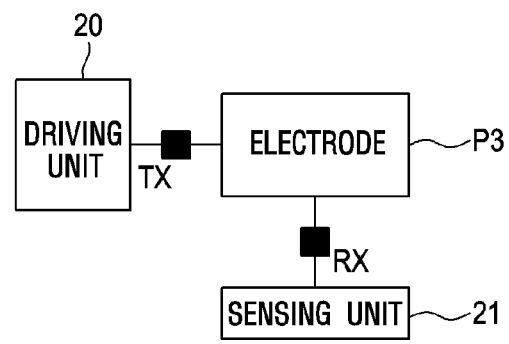
FIGS. 6A to 6C drawings illustrating operation and detection types of a pressure detection module of a device according to the present invention.
Figure 6B:
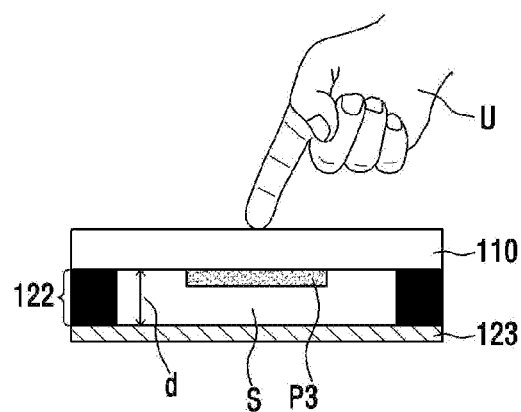
Figure 6C:
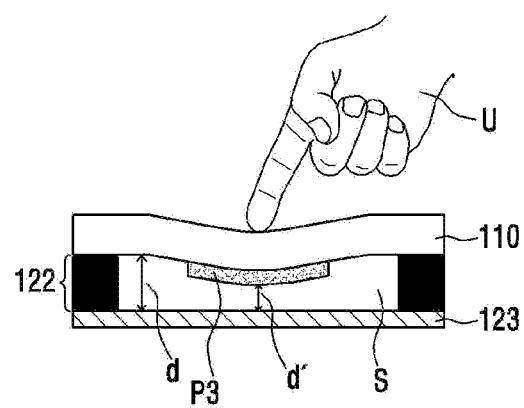

Unlike the above-described, the presence or absence and the magnitude of the 3D touch may be detected based on the self capacitance of the pressure electrode. FIGS. 6A to 6C illustrate a type in which the pressure detection module 122 detects the presence or absence of the 3D touch and/or the touch magnitude on the basis of the mutual capacitance between the pressure electrodes.

The pressure detection module 122 for detecting a change amount in the self capacitance uses a pressure electrode P3 formed in the bottom portion of the display 110. When a driving signal is applied to the pressure electrode P3, a signal including information about the change amount in the self capacitance is received, and the presence or absence of the 3D touch and/or the touch magnitude are detected.

The driving unit 20 applies the driving signal to the pressure electrode P3, the sensing unit 21 detects the presence or absence of the 3D touch and/or the touch magnitude by measuring, through the pressure electrode P3, the capacitance between the pressure electrode P3 and a reference potential layer 123 (e.g. the substrate) having a reference potential.

The driving unit 20 may include, for example, a clock generator (not shown) and a buffer to generate the driving signal in a pulse type, and apply the driving signal to the pressure electrode P3. However, this is merely exemplary, and the driving unit may be implemented with various elements, and the shape of the driving signal may be changed in various ways.

The driving unit 20 and the sensing unit 21 may be implemented with an integrated circuit, and formed on one chip. The driving unit 20 and the sensing unit 21 may compose a pressure detector.

The pressure electrode P3 may be formed so that the surface facing the reference potential layer 123 is large in order to easily detect the change amount in the capacitance with the reference potential layer 123. For example, the pressure electrode P3 may be formed in a planer shape pattern.

In relation to touch pressure detection in the self capacitance type, one pressure electrode P3 is exemplarily explained herein, but it is needless to say that a plurality of electrodes are adopted, and a plurality of channels are formed to detect pressure magnitudes according to multi-touches.

As the distance between the pressure electrode P3 and the reference potential layer 123 is changed, the self capacitance of the pressure electrode P3 is changed, and the sensing unit 21 senses information about such a change in the capacitance and detects the presence or absence of the 3D touch and/or the magnitude thereof.

FIG. 6B illustrates a layered structure of the pressure detection module 122 in order to detect a 3D touch using the aforementioned self capacitance change amount. As shown in FIG. 6B, the pressure electrode P3 is disposed with a prescribed separation distance d from the reference potential layer 123. Here, a material, which is deformable according to the pressure applied by the object U, may be disposed between the pressure electrode P3 and the reference potential layer 123. The deformable material disposed between the pressure electrode P3 and the reference potential layer 123 may be air, a dielectric material, an elastic material and/or a shock absorbing material.

When the object U applies a 3D touch having pressure of a prescribed magnitude or larger to the touch surface, the pressure electrode P3 and the reference potential layer 123 are close to each other according to the applied pressure, and the separation distance d is reduced.

FIG. 6C illustrates that the pressure is applied by the object U and the touch surface is bent downward. As the distance between the pressure electrode P3 and the reference potential layer 123 is closer from d to d', the self capacitance is changed. In detail, as a value of the self capacitance generated between the pressure electrode P3 and the reference potential layer 123 increases, a change or not in the self capacitance and a change amount therein are measured through the sensing unit 21, and thus the presence or absence and/or the magnitude of the 3D touch may be determined.

First Embodiment

Figure 7A:
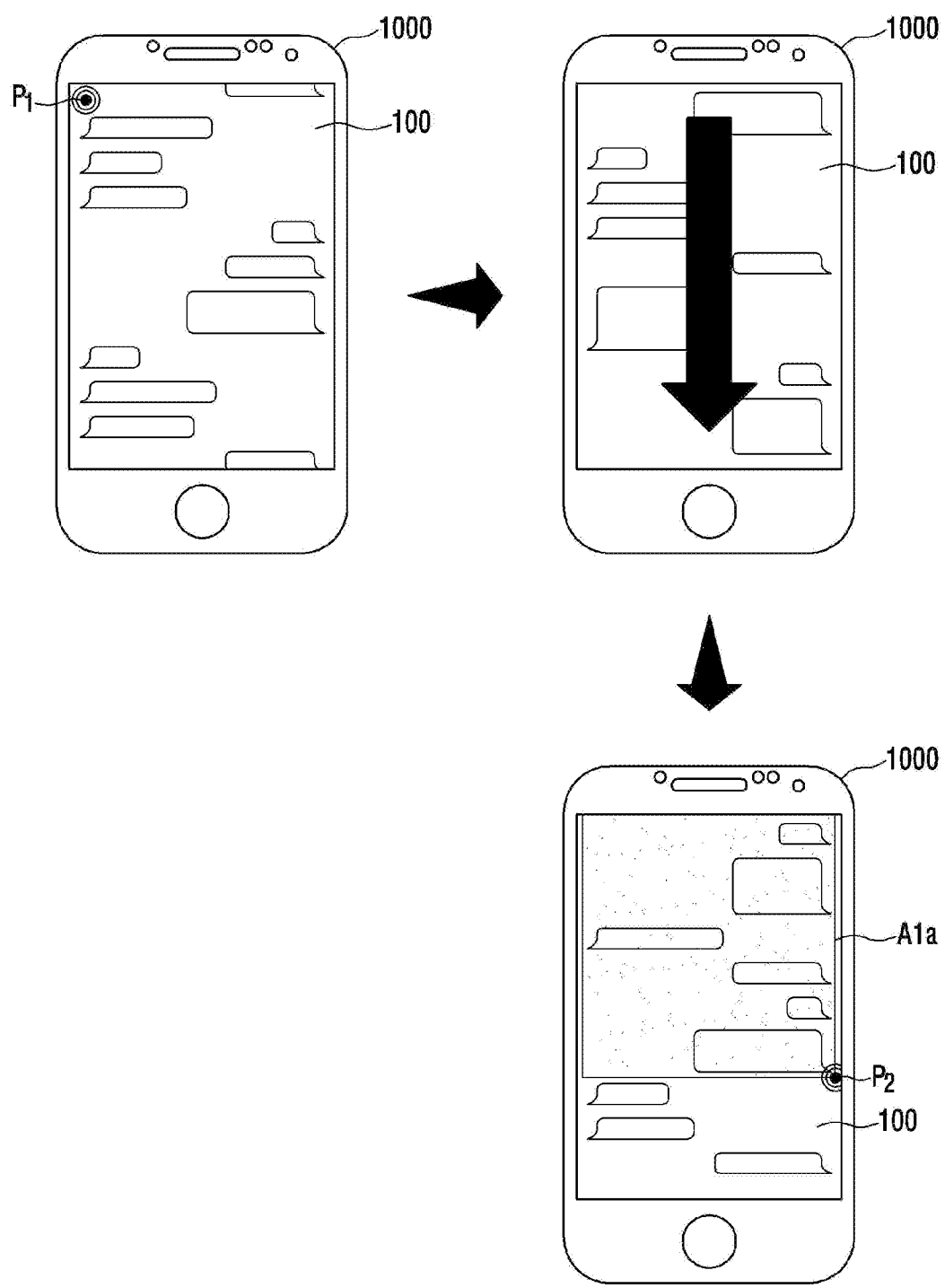
FIGS. 7A and 7B are drawings illustrating a screen selection type according to a first embodiment in a device according to the present invention.
Figure 7B:
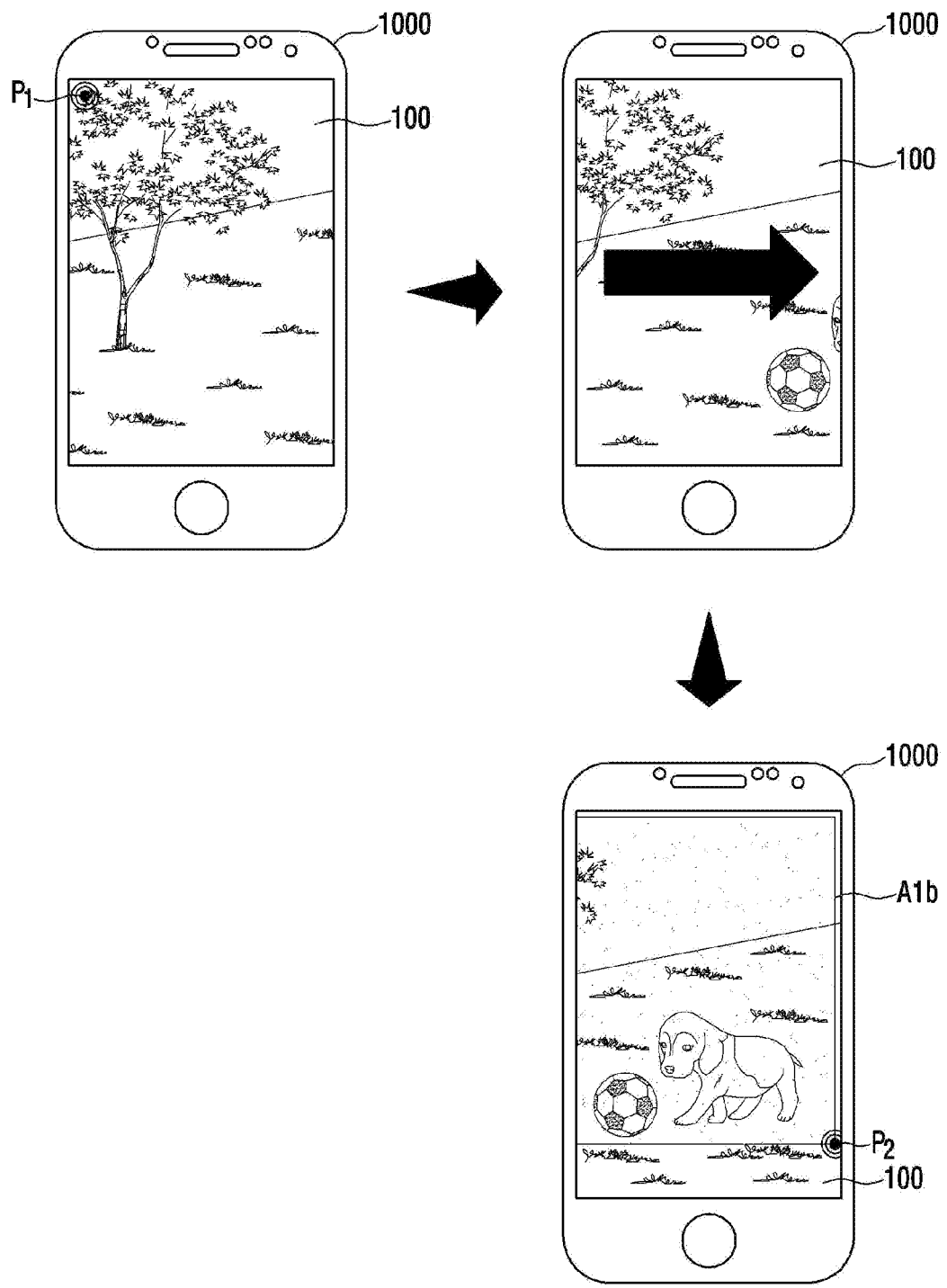

FIGS. 7A and 7B are drawings illustrating a screen selection type according to a first embodiment in the device 1000 according to the present invention.

First, a "scroll operation" will be defined before describing the device 1000 according to the present invention. The "scroll operation" is to move information displayed on a screen or a panel in a vertical direction or a horizontal direction, and to allow new information to appear in an opposite side as much as a disappeared portion on the moved screen. Such a function is necessary because an information amount (order of magnitude) is much more than that of a screen display function of a display unit.

Referring to FIG. 7A, when a user U performs a scroll operation through the touch screen 100 after applying a 3D touch (first pressure touch P1) having a prescribed magnitude or larger to the touch screen 100, other information is displayed on the touch screen 100 according to the scroll operation. Here, the information shown on the touch screen 100 is scrolled in the vertical direction according to the scroll operation, and the scrolled information is displayed. In addition, when a 3D touch (second pressure touch P2) having a prescribed magnitude or larger is applied to the touch screen 100 on which the scrolled screen is displayed, the control unit 200 sets, as a selection area A1a, an area defined by the position of the first pressure touch P1 and the position of the second touch P2.

Here, the scroll operation may include various kinds of gesture operations that may scroll the information displayed on the touch screen 100. In addition, the scroll operation may be a drag operation input on the touch screen 100. After the application of the first pressure touch P1, the drag operation is performed to scroll the information displayed on the touch screen 110 in the vertical direction, and to display the scrolled information.

Referring to FIG. 7A, when the first pressure touch P1 is sensed, a scroll operation input on the touch screen 100 is sensed, and then the second pressure touch P2 is sensed, the control unit 200 determines the position of the first pressure touch P1 and the position of the second pressure touch P2 to set the selection area A1a defined by the positions.

As shown in FIG. 7A, the selection area A1a may be an area defined by a quadrangle with the positions of the first pressure touch P1 and the second pressure touch P2 taken as corresponding vertices in a diagonal direction, but, in another embodiment, the selection area A1a may be defined by a polygon, a circle, an ellipse or the like defined by the positions of the first pressure touch P1 and the second pressure touch P2.

A user operation for setting the selection area A1a, namely, a drag operation among scroll operations on the touch screen 100 may be a drag (3D drag) operation in which the movement is performed from the position of the first pressure touch P1 to the position of the second pressure touch P2 in a state in which a pressure of a prescribed magnitude or larger is maintained. However, the present invention is not limited thereto, and it is also acceptable that a drag (2D drag) operation is also acceptable in which the movement is performed from the position of the first pressure touch P1 to the position of the second pressure touch P2 by a 2D touch in a state in which a pressure smaller than the prescribed magnitude is maintained.

When the 3D touch (the second pressure touch P2) is released, the control unit 200 may capture an image displayed in the selection area A1a. However, according to the present invention, the image displayed in the selection area A1a may be deleted or transmitted, etc. according to a user operation. Referring to FIG. 7A, the image displayed in the selection area A1a is shown, and an application may be composed to perform operations of deleting or transmitting, or etc. as well as capturing this image. The user U may set the selection area A1a, and capture, delete, or transmit, etc. the image displayed in the selection area A1a through simple operations of applying the first pressure touch P1 to the touch screen 100, performing a scroll operation, applying the second pressure touch P2 to set the selection area A1a, and then releasing the second pressure touch P2 from the touch screen 100 (in other words, taking the finger off (releasing a 3D touch) from the touch screen 100).

Here, the image should be interpreted to mean not only a picture or a video frame displayed on the touch screen 100, but also all the attributes displayed or to be able to be displayed on the touch screen 100 including a text, a symbol, a character, a number or the like.

Meanwhile, after the selection area A1a is set through the operation of the user U, the control unit 200 may receive a separate user operation again to capture, delete, or transmit, etc. an image. For example, after the selection area A1a is set, a touch (2D or 3D touch) is input in the selection area A1a, the control unit 200 may capture, delete, or transmit, etc. the image displayed in the selection area A1a.

In addition, when a separate button is displayed on a portion of the touch screen 100 and a touch (2D or 3D) is input in the area in which the button is displayed, the image displayed in the selection area A1a may be captured, deleted, or transmitted, etc.

Furthermore, the control unit 200 may capture, delete, or transmit, etc. the image through multi-touch operations. In detail, when a separate touch (2D or 3D touch) is sensed on the touch screen 100 while a touch (2D or 3D) for setting the selection area A1a is input, the control unit 200 may also capture, delete, or transmit, etc. the image displayed on the selection area A1a.

In such an embodiment, a separate user operation (2D or 3D touch input) is required, and thus a user operation for modifying the selection area A1a may be received before the user operation for capturing, deleting, or transmitting, etc. is input.

In other words, when the user U touches and drags the selection area A1a in a state in which the selection area A1a is set, the control unit 200 may sense the operation to change the range of the selection area A1a, and when a 2D touch or a 3D touch is input in the changed selection area A1a, the control unit 200 may capture, delete, or transmit, etc. an image displayed in the changed selection area A1a.

Other embodiments will be described more specifically with reference to other drawings below.

A captured image is stored in the memory 300, and the control unit 200 may display the image stored in the memory on the touch screen 100.

Figure 17:
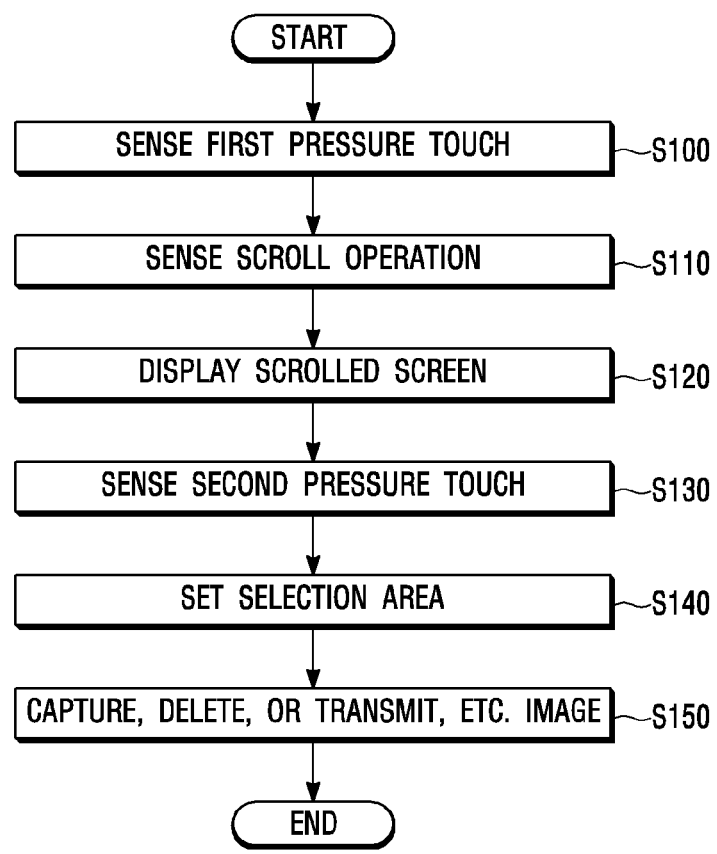
FIG. 17 is a flowchart illustrating a screen selection method according to a first embodiment of the present invention.

FIG. 17 is a flowchart of a screen selection method according to the present invention, which is related to the above-described first embodiment.

Referring to FIG. 17, in the screen selection method according to the present invention, first, a 3D touch (the first pressure touch P1) having a pressure of a prescribed magnitude or larger is sensed on the screen 100 (step S100). Then, a scroll operation input through the touch screen 100 is sensed (step S110), and a screen displayed on the touch screen 100 is scrolled and displayed according to the scroll operation (step S120).

Then, a 3D touch (the second pressure touch P2) having a pressure of a prescribed magnitude or larger, which is input on the scrolled screen, is sensed (step S130). The control unit 200 determines the position of the first pressure touch P1 and the position of the second pressure touch P2, and sets an area defined by the positions as the selection area A1a (operation S140). A setting type of the selection area A1a is the same as the aforementioned, and thus the description thereabout will be omitted.

Then, an image displayed in the set selection area A1a is captured, deleted, or transmitted, etc. through user operations in various ways for the set selected area A1a (step S150).

Similarly to the descriptions about the first embodiment, in FIG. 7B, a screen moved in a horizontal direction through a scroll operation is displayed. An algorithm operated in FIG. 7B is substantially the same as that described with reference to FIG. 7A, and only the difference therebetween is that the scrolled direction is vertical or horizontal.

Referring to FIG. 7B, when the user U applies a 3D touch (the first pressure touch P1) having a pressure of a prescribed magnitude or larger on the touch screen 100 and then performs a scroll operation through the touch screen 100, other information is displayed on the touch screen 100 according to the scroll operation. Here, the information displayed on the touch screen 100 according to the scroll operation is scrolled in the horizontal direction and the scrolled information is displayed. In addition, when a 3D touch (second pressure touch P2) having a prescribed magnitude or larger is applied on the touch screen 100 on which the scrolled screen is displayed, the control unit 200 sets, as a selection area A1b, an area defined by the position of the first pressure touch P1 and the position of the second touch P2.

Here, the scroll operation may include various kinds of gesture operations which may scroll the information displayed on the touch screen 100. In addition, the scroll operation may be a drag operation input on the touch screen 100, and the drag operation after the application of the first pressure touch P1 may allow the information displayed on the touch screen 100 to be scrolled in the horizontal direction and allow the scrolled information to be displayed.

With reference to FIG. 7B, when the first pressure touch P1 is sensed, the scroll operation input on the touch screen 100 is sensed, and the second pressure touch P2 is sensed, the control unit 200 determines the position of the first pressure touch P1 and the position of the second pressure touch P2 to set the selection area A1b defined by the positions.

As shown in FIG. 7B, the selection area A1b may be an area defined by a quadrangle with the positions of the first pressure touch P1 and the second pressure touch P2 taken as corresponding vertices in a diagonal direction, but, in another embodiment, may be defined by a polygon, a circle, an ellipse or the like defined by the positions of the first pressure touch P1 and the second pressure touch P2. Descriptions about other parts are substantially the same as the aforementioned with reference to FIG. 7A.

Second Embodiment

Figure 8:
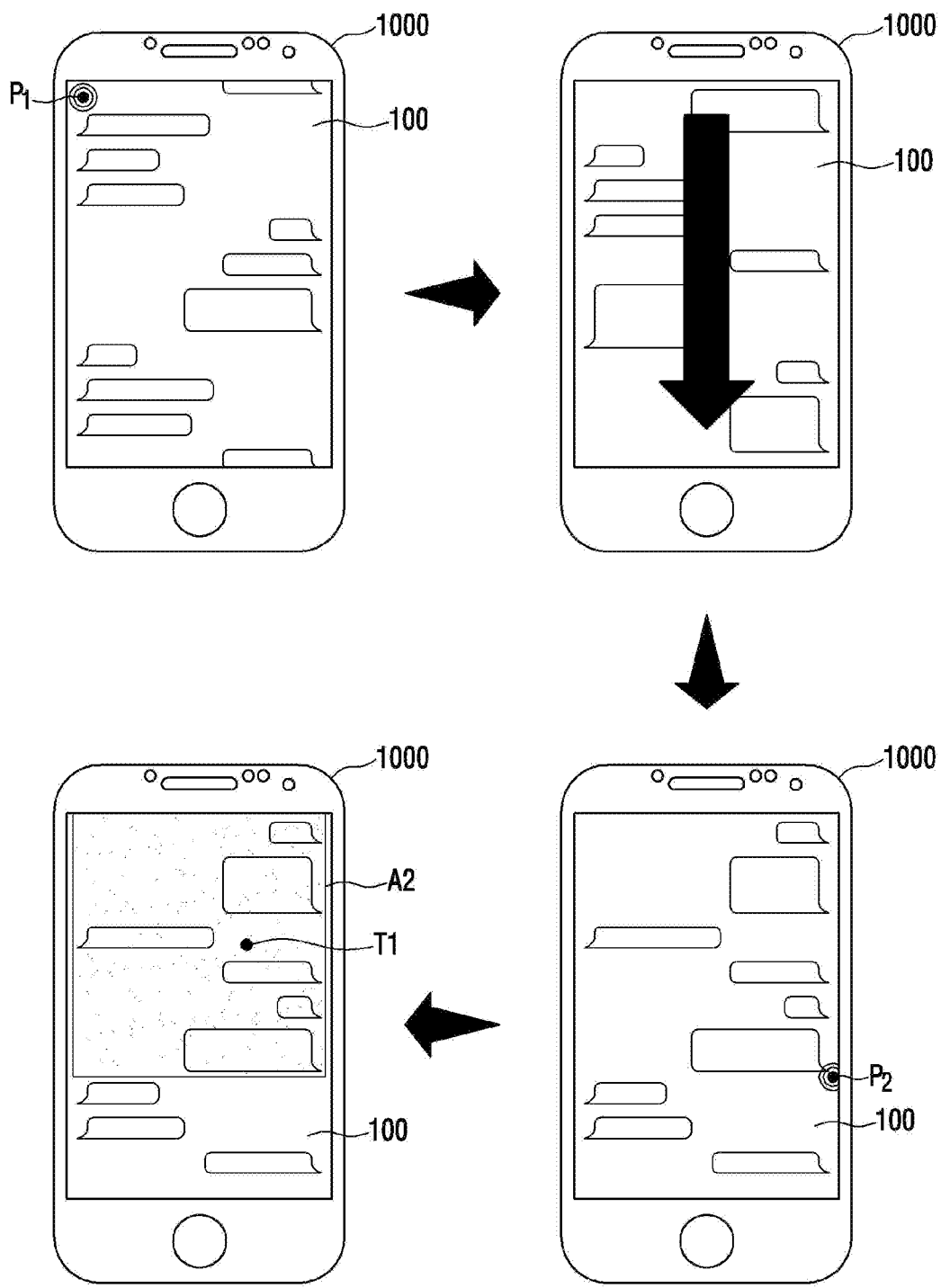
FIG. 8 is a drawing illustrating a screen selection type according to a second embodiment of the present invention.

FIG. 8 is a drawing illustrating a screen selection type according to a second embodiment in the device 1000 according to the present invention.

Referring to FIG. 8, the user U applies the first pressure touch P1 on the touch screen 100, performs a scroll operation, applies the second pressure touch P2 to set a selection area A2, and releases the second pressure touch P2. In addition, the user U applies a 2D touch T1 on the touch screen 100 to acquire an image displayed on the selection area A2. Here, the position at which the second pressure touch P2 is applied and the position at which the 2D touch T1 is applied may be the same or different from each other.

For other elements, the technical idea of the present invention according to the second embodiment is substantially the same as that of the present invention according to the first embodiment. In other words, unlike the example illustrated in FIG. 8, the scroll operation may be performed in the horizontal direction as well as in the vertical direction.

However, the capturing, deletion, or transmission, etc. for the image displayed in the selection area A2 is performed not by releasing the second pressure touch P2, but by applying the 2D touch T1 on the touch screen 100 after releasing the second pressure touch P2.

In the present embodiment, the control unit 200 sets, as the selection area A2, an area defined by the positions of the first pressure touch P1 and the second pressure touch P2. In detail, the control unit 200 may set, as the selection A2, an area defined by a quadrangle with the positions of the first pressure touch P1 and the second pressure touch P2 taken as corresponding vertices in a diagonal direction. However, the shape of the selection area A2 is not limited to the quadrangle, and a polygon, a circle, an ellipse or the like defined by the positions of the first pressure touch P1 and the second pressure touch P2 is also possible.

The captured image may be stored in the memory 300, and the control unit 200 may read out the image stored in the memory 300 and display the image on the touch screen 100.

Third Embodiment

Figure 9:
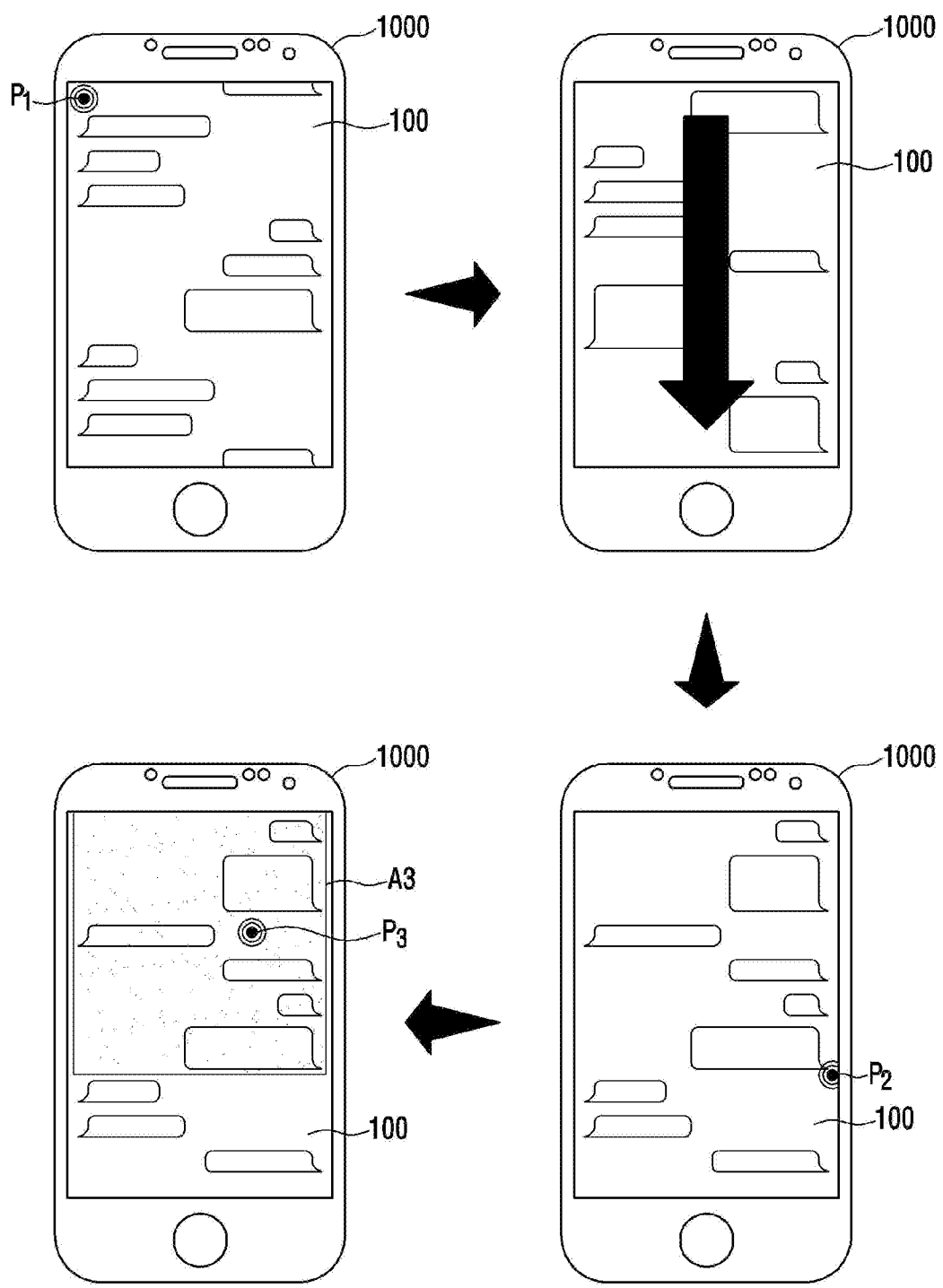
FIG. 9 is a drawing illustrating a screen selection type according to a third embodiment of the present invention.

FIG. 9 is a drawing illustrating a screen selection type according to a third embodiment in the device 1000 according to the present invention.

Referring to FIG. 9, the user U applies the first pressure touch P1 to the touch screen 100, performs a scroll operation, applies the second pressure touch P2 to set a selection area A3, and releases the second pressure touch P2. In addition, the user U applies a third pressure touch P3 having a pressure of a prescribed magnitude or larger on the touch screen 100 to perform capturing, deletion, or transmission, etc. on an image displayed in the selection area A3. Here, the position at which the second pressure touch P2 is applied and the position at which the 2D touch T1 is applied may be the same or different from each other.

For other elements, the technical idea of the present invention according to the third embodiment is substantially the same as that of the present invention according to the first and second embodiments. In other words, unlike the example illustrated in FIG. 8, the scroll operation may be performed in the horizontal direction as well as in the vertical direction.

However, the capturing, deletion, or transmission, etc. for the image displayed in the selection area A3 is performed not by releasing the second pressure touch P2, but by applying the third pressure touch P3 on the touch screen 100 after releasing the second pressure touch P2.

In the present embodiment, the control unit 200 sets, as the selection area A3, an area defined by the positions of the first pressure touch P1 and the second pressure touch P2. In detail, the control unit 200 may set, as the selection A3, an area defined by a quadrangle with the positions of the first pressure touch P1 and the second pressure touch P2 taken as corresponding vertices in a diagonal direction. However, the shape of the selection area A3 is not limited to the quadrangle, and a polygon, a circle, an ellipse or the like defined by the positions of the first pressure touch P1 and the second pressure touch P2 is also possible.

The captured image may be stored in the memory 300, and the control unit 200 may read out the image stored in the memory 300 and display the image on the touch screen 100.

Fourth Embodiment

Figure 10:
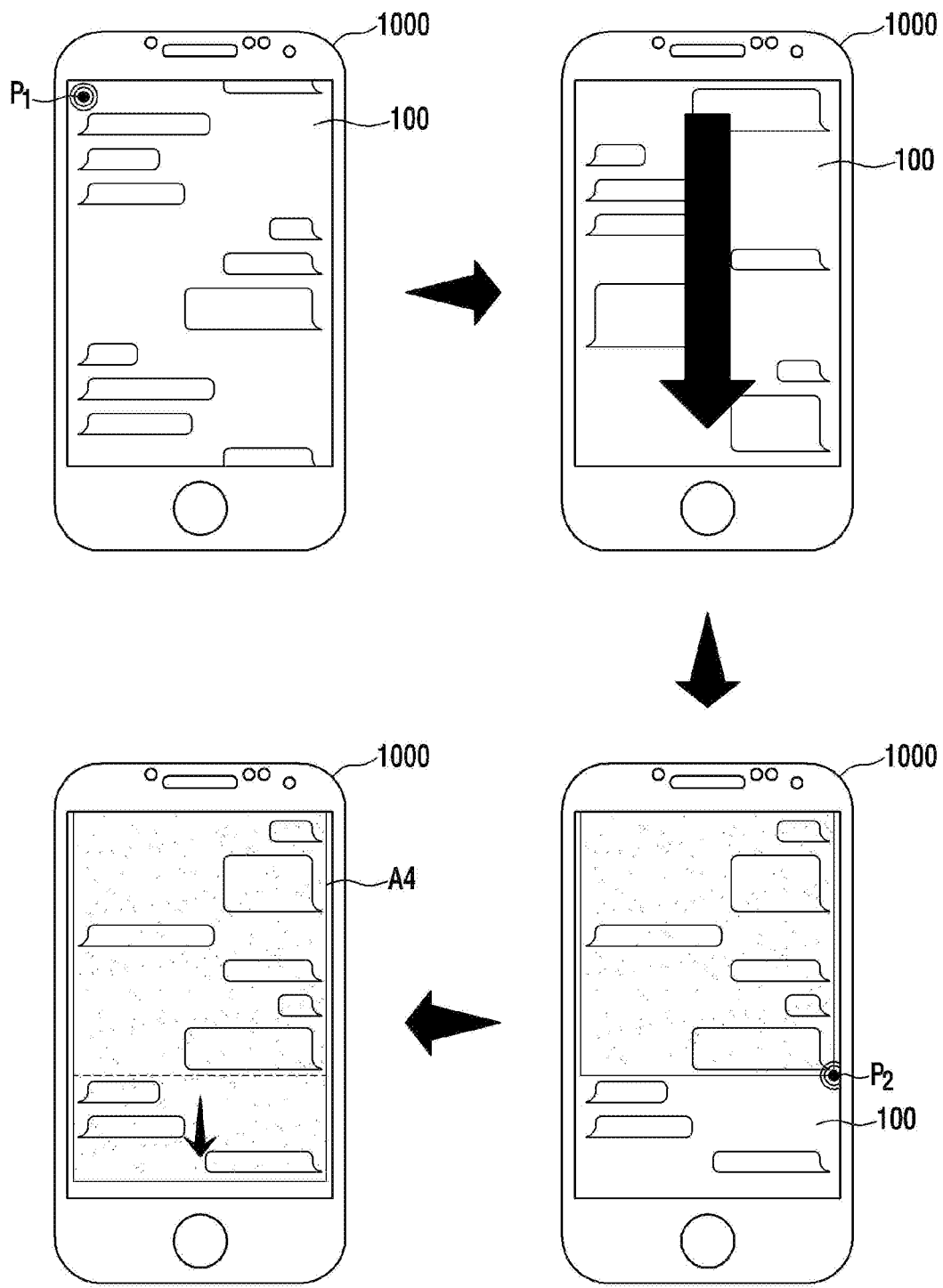
FIG. 10 is a drawing illustrating a screen selection type according to a fourth embodiment of the present invention.

FIG. 10 is a drawing illustrating a screen selection type according to a fourth embodiment in the device 1000 according to the present invention.

Referring to FIG. 10, the user U applies the first pressure touch P1 on the touch screen 100, performs a scroll operation, and applies the second pressure touch P2. Thereafter, the user may perform selection area modification for modifying the range of a capturing area, and a modified selection area A4 is reset.

When the range is changed and the modified selection area A4 is selected, a 2D touch or a 3D touch is applied to perform capturing, deletion, or transmission, etc. on an image included in the selection area A4. The operation for modifying the selection area may be performed by, for example, applying a drag operation by the user U on the touch screen 100, but the present invention is not limited thereto.

For other elements, the technical idea of the present invention according to the fourth embodiment is substantially the same as that of the present invention according to the first to third embodiments. In other words, unlike the example illustrated in FIG. 10, the scroll operation may be performed in the horizontal direction as well as in the vertical direction.

In the present embodiment, the control unit 200 senses the position of the first pressure touch P1 and the position of the second pressure touch P2 to define the selection area A4, but newly sets the selection area A4 that is modified and changed by the operation of the user U. In detail, the control unit 200 may initially set, as a selection, an area defined by a quadrangle with the positions of the first pressure touch P1 and the second pressure touch P2 taken as corresponding vertices in a diagonal direction, and additionally and newly set the selection area A4 that is changed and modified by the operation of the user U. However, the shape of the selection area A4 is not limited to the quadrangle, and may be the shape that a polygon, a circle, an ellipse or the like defined by the positions of the first pressure touch P1 and the second pressure touch P2 is modified and changed.

The captured image may be stored in the memory 300, and the control unit 200 may read out the image stored in the memory 300 and display the image on the touch screen 100.

Figure 18:
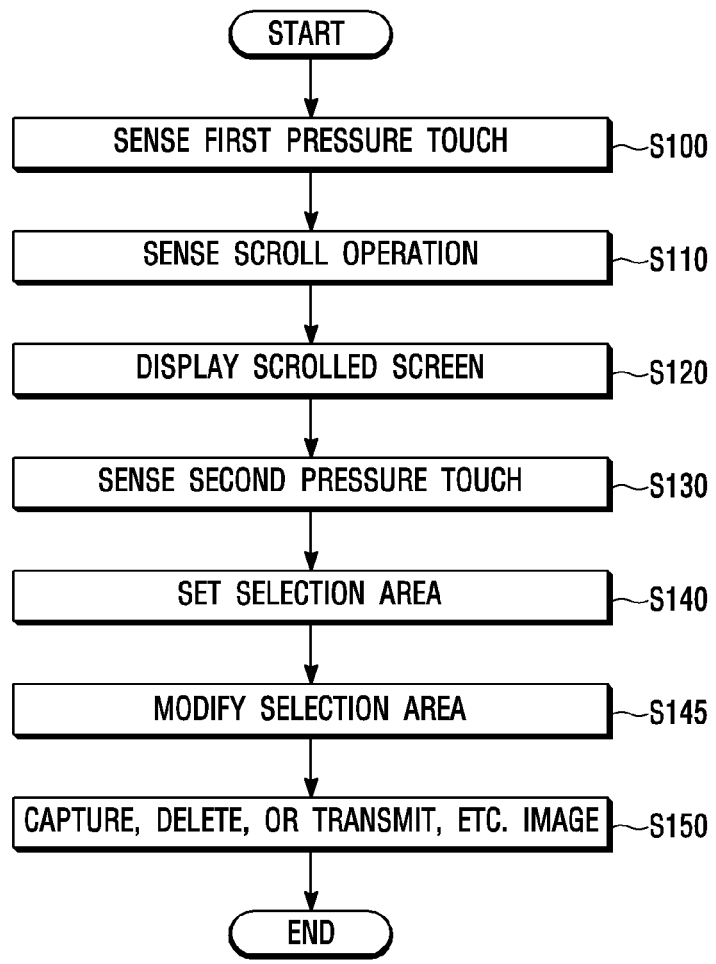
FIG. 18 is a flowchart illustrating a screen selection method according to a fourth embodiment of the present invention.

FIG. 18 is a flowchart of a screen selection method according to the present invention, which is related to the above-described fourth embodiment.

Referring to FIG. 18, in the screen selection method according to the present invention, first, a 3D touch (the first pressure touch P1) having a pressure of a prescribed magnitude or larger is sensed on the screen 100 (step S100). Then, a scroll operation input through the touch screen 100 is sensed (step S110), and a screen displayed on the touch screen 100 is scrolled and displayed according to the scroll operation (step S120).

Then, a 3D touch (the second pressure touch P2) having a pressure of a prescribed magnitude or larger, which is input on the scrolled screen, is sensed (step S130). The control unit 200 determines the positions of the first pressure touch P1 and the second pressure touch P2, and sets an area defined by the positions as a first selection area (step S140). In addition, with respect to the initial first selection area, the range or the shape of the selection area is modified according to an operation of the user U to set a second selection area (step S145). A type for setting the first selection area or modifying the first selection area to the second selection area is the same as the above-described and thus descriptions thereabout will be omitted.

Then an image displayed in the set second selection area is captured, deleted, or transmitted, etc. by user operations for the set second selection area in various ways (step S150).

Similarly to the descriptions about the first to third embodiments, the scroll direction of the screen to be displayed by the scroll operation may be vertical or horizontal.

Fifth Embodiment

Figure 11:
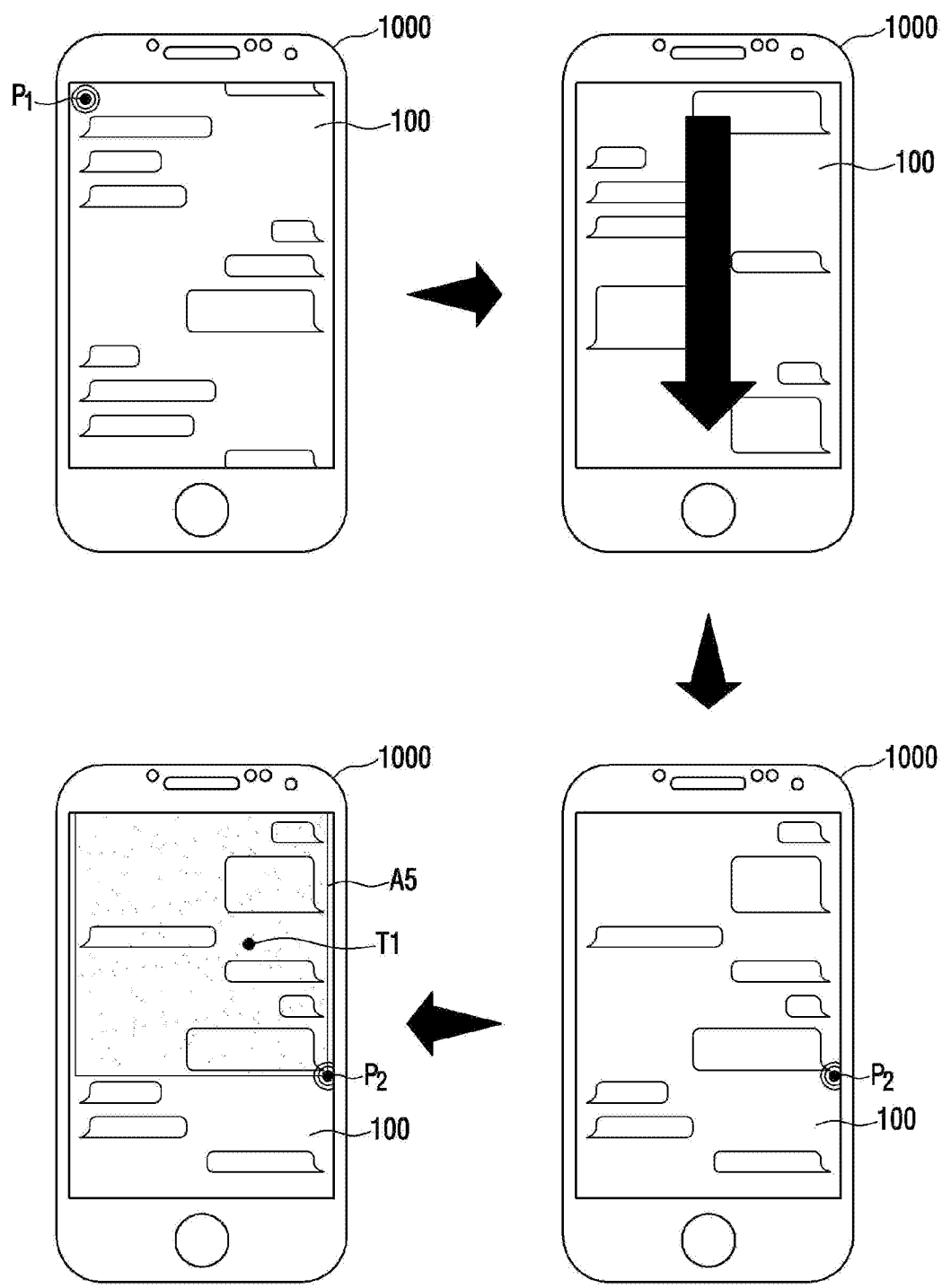
FIG. 11 is a drawing illustrating a screen selection type according to a fifth embodiment of the present invention.

FIG. 11 illustrates a screen selection type according to a fifth embodiment in the device 100 according to the present invention.

Referring to FIG. 11, the user U applies the first pressure touch P1 on the touch screen 100, performs a scroll operation, and applies the second pressure touch P2 to set a selection area A5. Here, while the second pressure touch P2 is applied, a 2D touch T1 is applied on the touch screen 100 to perform capturing, deletion, or transmission, etc. on an image displayed on the selection area A5. Here, the position at which the second pressure touch P2 is applied and the position at which the 2D touch T1 is applied are different from each other.

For other elements, the technical idea of the present invention according to the fifth embodiment is substantially the same as that of the present invention according to the first and fourth embodiments. In other words, unlike the example illustrated in FIG. 11, the scroll operation may be performed in the horizontal direction as well as in the vertical direction.

However, the capturing, deletion, or transmission, etc. for the image displayed in the selection area is performed not by releasing the second pressure touch P2, but by applying the 2D touch T1 on the touch screen 100 while the second pressure touch P2 is applied.

In the present embodiment, the control unit 200 sets, as the selection area A5, an area defined by the positions of the first pressure touch P1 and the second pressure touch P2. In detail, the control unit 200 may set, as the selection A5, an area defined by a quadrangle with the positions of the first pressure touch P1 and the second pressure touch P2 taken as corresponding vertices in a diagonal direction. However, the shape of the selection area A5 is not limited to the quadrangle, and a polygon, a circle, an ellipse or the like defined by the positions of the first pressure touch P1 and the second pressure touch P2 is also possible.

The captured image may be stored in the memory 300, and the control unit 200 may read out the image stored in the memory 300 and display the image on the touch screen 100.

Sixth Embodiment

Figure 12:
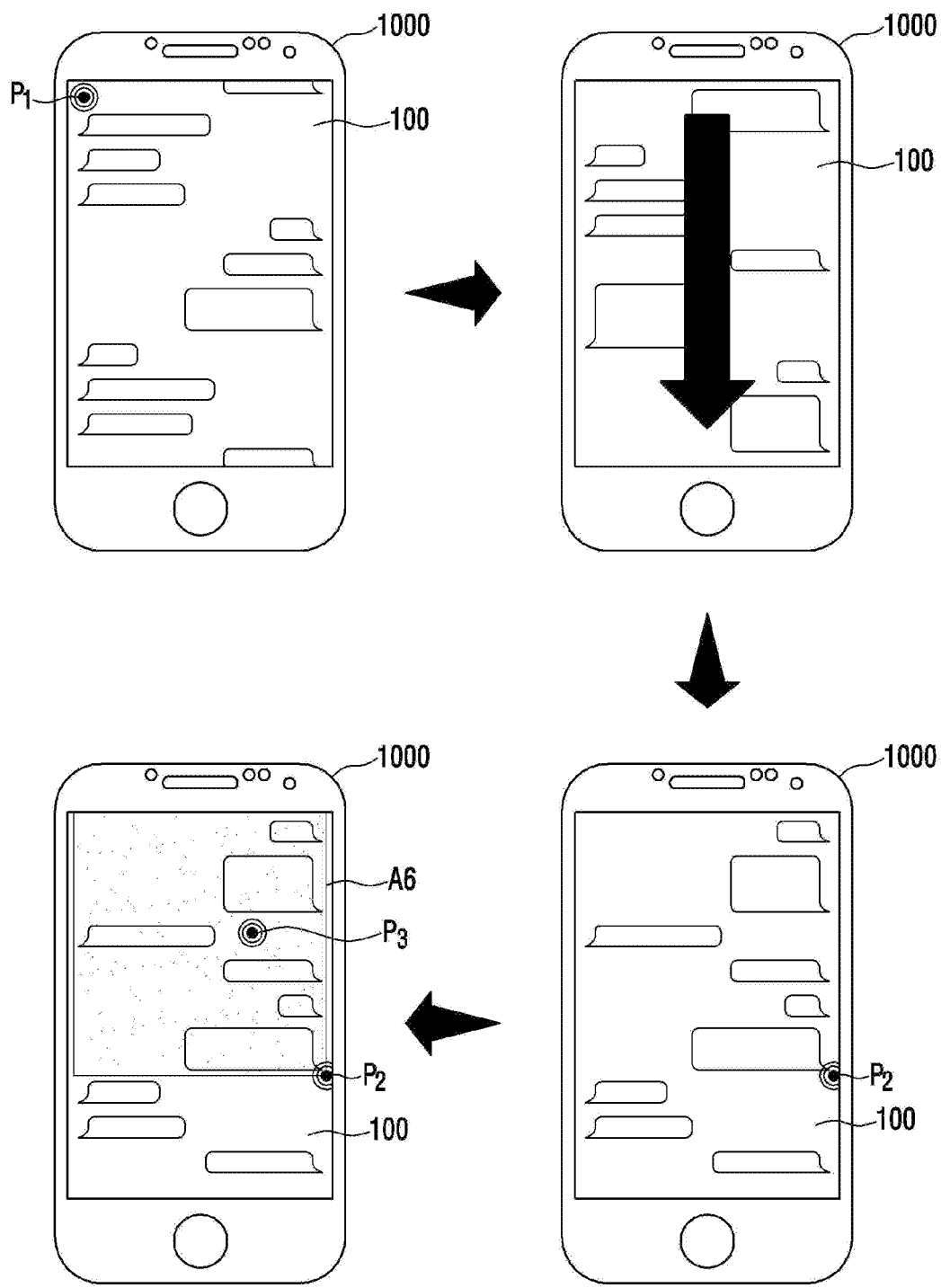
FIG. 12 is a drawing illustrating a screen selection type according to a sixth embodiment of the present invention.

FIG. 12 is a drawing illustrating a screen selection type according to a sixth embodiment in the device 1000 according to the present invention.

Referring to FIG. 12, the user U applies the first pressure touch P1 on the touch screen 100, performs a scroll operation, and applies the second pressure touch P2 to set a selection area A6. Here, while the second pressure touch P2 is applied, a third pressure touch P3 is applied on the touch screen 100 to perform capturing, deletion, or transmission, etc. on an image displayed on the selection area A5. Here, the position at which the second pressure touch P2 is applied and the position at which the third pressure touch P3 is applied are different from each other.

For other elements, the technical idea of the present invention according to the sixth embodiment is substantially the same as that of the present invention according to the first and fifth embodiments. In other words, unlike the example illustrated in FIG. 12, the scroll operation may be performed in the horizontal direction as well as in the vertical direction.

However, the capturing, deletion, or transmission, etc. for the image displayed in the selection area A6 is performed not by releasing the second pressure touch P2, but by applying the third pressure touch P3 on the touch screen 100 while the second pressure touch P2 is applied.

In the present embodiment, the control unit 200 sets, as the selection area A6, an area defined by the positions of the first pressure touch P1 and the second pressure touch P2. In detail, the control unit 200 may set, as the selection A6, an area defined by a quadrangle with the positions of the first pressure touch P1 and the second pressure touch P2 taken as corresponding vertices in a diagonal direction. However, the shape of the selection area A6 is not limited to the quadrangle, and a polygon, a circle, an ellipse or the like defined by the positions of the first pressure touch P1 and the second pressure touch P2 are also possible.

The captured image may be stored in the memory 300, and the control unit 200 may read out the image stored in the memory 300 and display the image on the touch screen 100.

Seventh Embodiment

Figure 13:
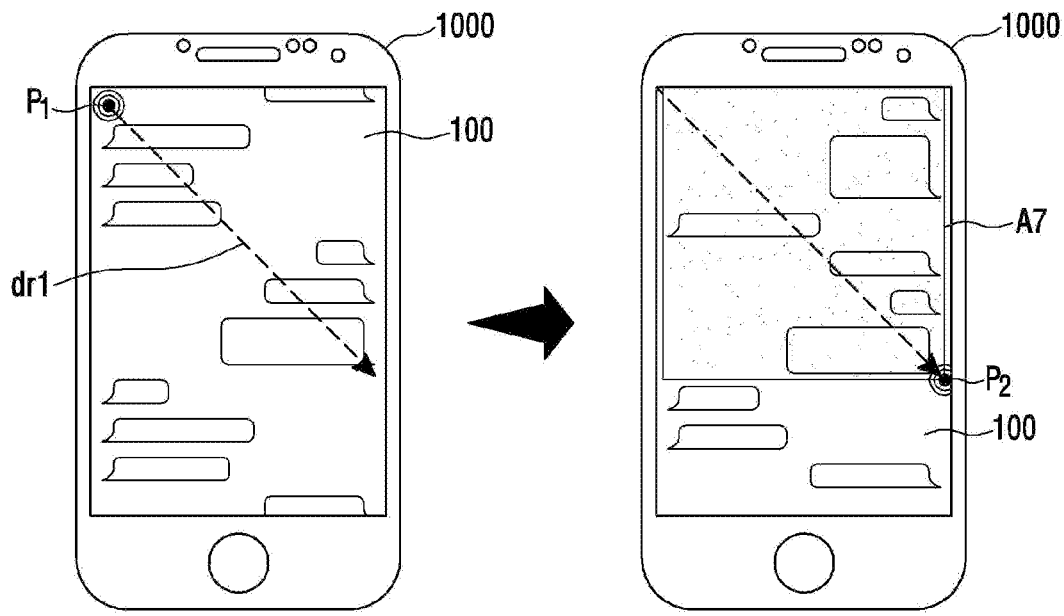
FIG. 13 is a drawing illustrating a screen selection type according to a seventh embodiment of the present invention.

FIG. 13 is a drawing illustrating a screen selection type according to a seventh embodiment in the device 1000 according to the present invention.

Hereinafter, "a drag operation", "a tap touch", and "a pressure touch" are defined, and they are used according to meanings defined in the present specification. The "drag operation" means that a touch object is dragged to change a position to be pointed, and also defines that, during the drag operation, the touch object is not separated from the touch screen 100 and a contact therewith is maintained. In addition, the "pressure touch" means a touch having a pressure of a prescribed magnitude or larger, which is input on the touch screen 100, and a touch other than such a pressure touch is defined as the "tap touch".

In addition, the drag operation may drag the touch object in the tap touch state to change the point to be pointed, or drag the touch object in the pressure touch state to change the point to be pointed. Among the drag operations, the tap touch state and the pressure touch state may alternatively occur.

Referring to FIG. 13, the user U applies the first pressure touch P1 on the touch screen 100, performs a scroll operation, and applies the second pressure touch P2 to set a selection area A7. Here, after setting the selection area A7, an image included in the selection area A7 may be captured, deleted, or transmitted, etc., and the various above-described types for the image capturing, deletion, or transmission, etc., may be adopted, and the descriptions thereabout will be omitted.

In addition, the drag operation herein may move the screen displayed on the touch screen 100 in the up and down directions or the left and right directions, and the screen displayed on the touch screen 100 may be changed and displayed as in the scroll operation while being moved in the up and down directions or the left and right directions with reference to a direction in which the drag operation is activated.

In the present embodiment, the control unit 200 sets, as the selection area A7, an area defined by the positions of the first pressure touch P1 and the second pressure touch P2. In detail, the control unit 200 may set, as the selection A7, an area defined by a quadrangle with the positions of the first pressure touch P1 and the second pressure touch P2 taken as corresponding vertices in a diagonal direction. However, the shape of the selection area A7 is not limited to the quadrangle, and a polygon, a circle, an ellipse or the like defined by the position of the first pressure touch P1 and the position of the second pressure touch P2 are also possible.

The captured image may be stored in the memory 300, and the control unit 200 may read out the image stored in the memory 300 and display the image on the touch screen 100.

Figure 19:
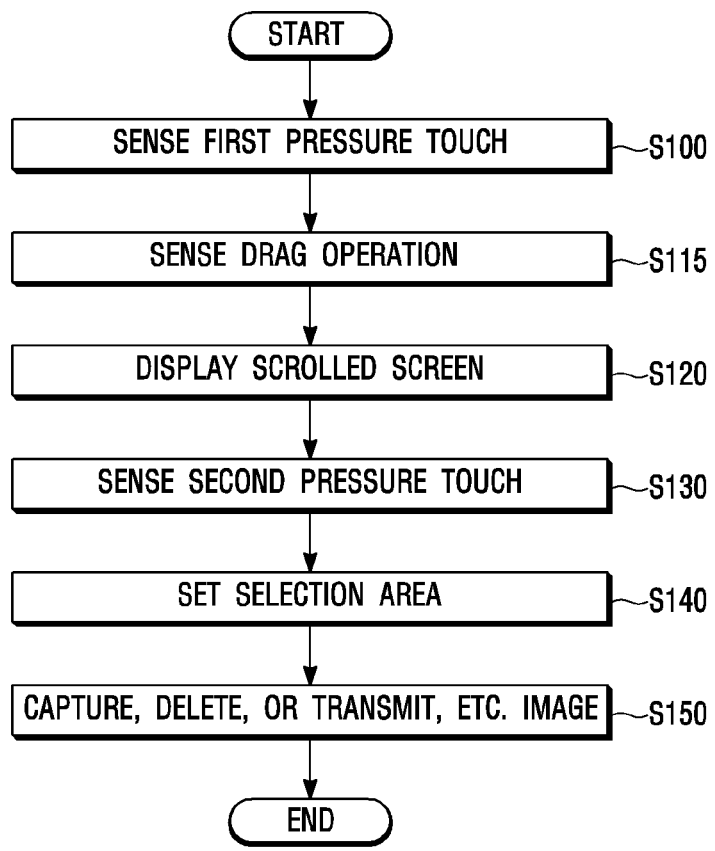
FIG. 19 is a flowchart illustrating a screen selection method according to a seventh embodiment of the present invention.

FIG. 19 is a flowchart of a screen selection method according to the present invention and is related to the aforementioned seventh embodiment.

Referring to FIG. 19, in the screen selection method according to the present invention, first, a 3D touch (the first pressure touch P1) having a pressure of a prescribed magnitude or larger is sensed on the screen 100 (step S100). Then, a drag operation input through the touch screen 100 is sensed (step S115), and a screen displayed on the touch screen 100 according to the drag operation is moved in the up and down directions or in the left and right directions and displayed (a scrolled screen is displayed) (step S120).

Then, a 3D touch (the second pressure touch P2) having a pressure of a prescribed magnitude or larger, which is input on the scrolled screen, is sensed (step S130). The control unit 200 determines the position of the first pressure touch P1 and the position of the second pressure touch P2, and sets an area defined by the positions as a selection area (step S140). Then, an image displayed in the set selection area is captured, deleted, or transmitted, etc. by user operations for the set selection area in various ways (step S150).

Eighth Embodiment

Figure 14:
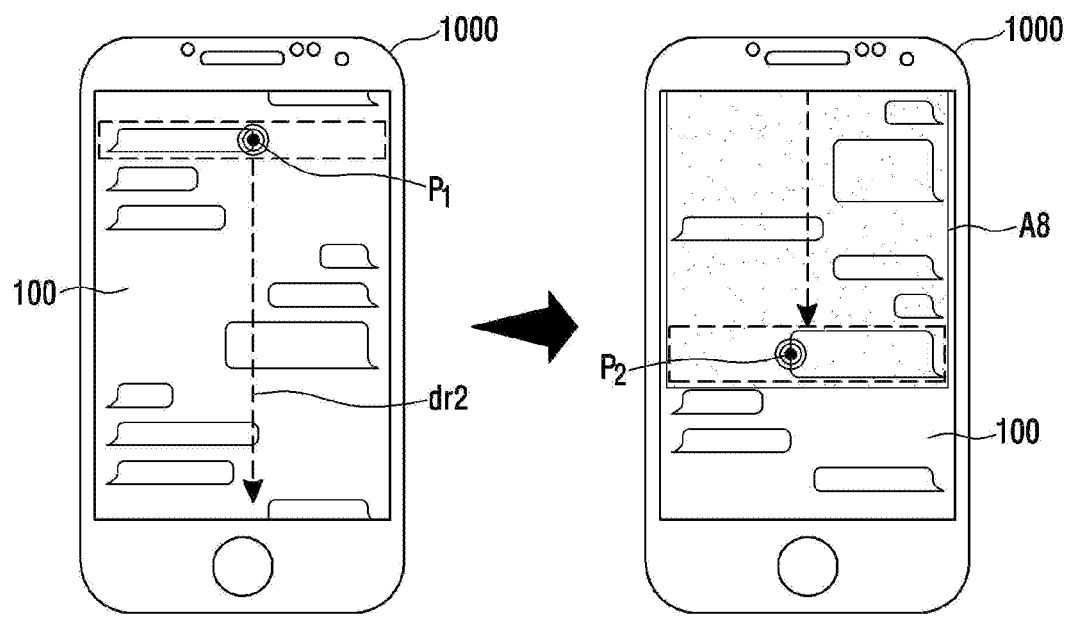
FIG. 14 is a drawing illustrating a screen selection type according to an eighth embodiment of the present invention.

FIG. 14 is a drawing illustrating a screen selection type according to an eighth embodiment in the device 1000 according to the present invention.

Referring to FIG. 11, the user U applies the first pressure touch P1 to the touch screen 100, performs a scroll operation, and applies the second pressure touch P2 to set a selection area A8. Here, after setting the selection area A8, an image included in the selection area A8 may be captured, deleted, or transmitted, etc., and, for the image capturing, deletion, or transmission, etc., the various above-described types may be adopted, and the descriptions thereabout will be omitted.

The eighth embodiment of the present invention may be used in a messenger application program in which the first pressure touch is applied in a first message area, and the second pressure touch P2 is applied in a second message area after a drag operation or a scroll operation to set an area between the first message area and the second message area as the selection area A8.

In the present embodiment, the control unit 200 sets, as the selection area A8, an area between the first message area selected by the application of the first pressure touch P1 and the second message area selected by the application of the second pressure area. An image displayed in the selection area A8, which is set by user operations in various types on the selection area A8, may be captured, deleted, or transmitted, etc.

The captured image may be stored in the memory 300, and the control unit 200 may read out the image stored in the memory 300 and display the image on the touch screen 100.

Ninth Embodiment

Figure 15:
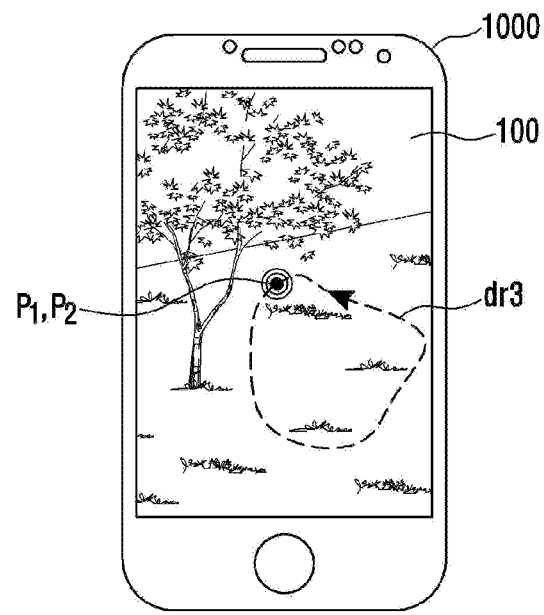
FIG. 15 is a drawing illustrating a screen selection type according to a ninth embodiment of the present invention.

FIG. 15 is a drawing illustrating a screen selection type according to a ninth embodiment in the device 1000 according to the present invention.

Referring to FIG. 15, the user U applies the first pressure touch P1 on the touch screen 100, performs a scroll operation, and applies the second pressure touch P2 to set a selection area. Here, the drag operation may be performed in an arbitrary direction according to a direction intended by the user U so that the selection area having an arbitrary shape is displayed on the touch screen 100.

When the second pressure touch P2 is applied on the touch screen 100 in correspondence to the position at which an initial first pressure touch P1 is applied, the selection area is set according to the input of the second pressure touch P2, and an image included in the selection area may be captured, deleted, or transmitted, etc. by means of various user operations.

However, for capturing, deletion, or transmission, etc. of the image included in the selection area, the various above-described types may be adopted, and the descriptions thereabout will be omitted.

In the present embodiment, the control unit 200 may set the selection area by means of the position of the first pressure touch P1 and the application of the second pressure touch P2, and may capture, delete, or transmit, etc. the image included in the selection area.

The captured image may be stored in the memory 300, and the control unit 200 may read out the image stored in the memory 300 and display the image on the touch screen 100.

Figure 20:
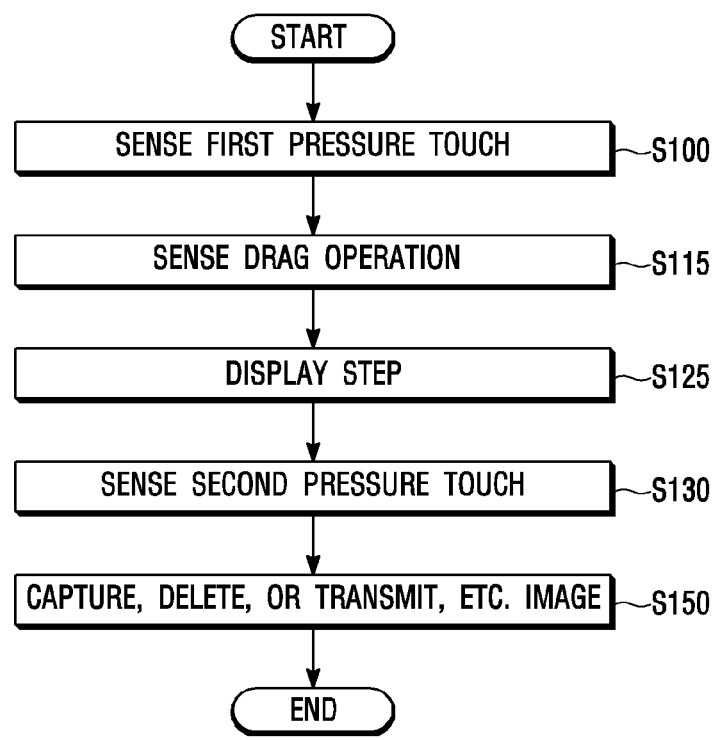
FIG. 20 is a flowchart illustrating a screen selection method according to a ninth embodiment of the present invention.

FIG. 20 is a flowchart of a screen selection method according to the present invention, which is related to the aforementioned ninth embodiment.

Referring to FIG. 20, in the screen selection method according to the present invention, first, a 3D touch (the first pressure touch P1) having a pressure of a prescribed magnitude or larger is sensed on the screen 100 (step S100). Then, a drag operation input through the touch screen 100 is sensed (step S110), but such a drag operation may be a drag operation that a user performs dragging on the touch screen 100 along an arbitrary direction.

According to the drag operation, a selection area having an arbitrary shape is displayed on the touch screen 100 (step S125).

Then, the second pressure touch P2 input to a position corresponding to the position at which the first pressure touch P1 is applied is sensed (step S130). When the second pressure touch P2 is applied to the position corresponding to the position at which the first pressure touch P1 is applied, the control unit 200 may set a selection area and perform capturing, deletion, or transmission, etc. an image included in the selection area by means of various user operations (step S150). However, the performing of capturing, deletion, or transmission, etc. on the image in the set selection area may be performed by means of various types of user operations, and such types may correspond to the above-described types.

Tenth Embodiment

Figure 16:
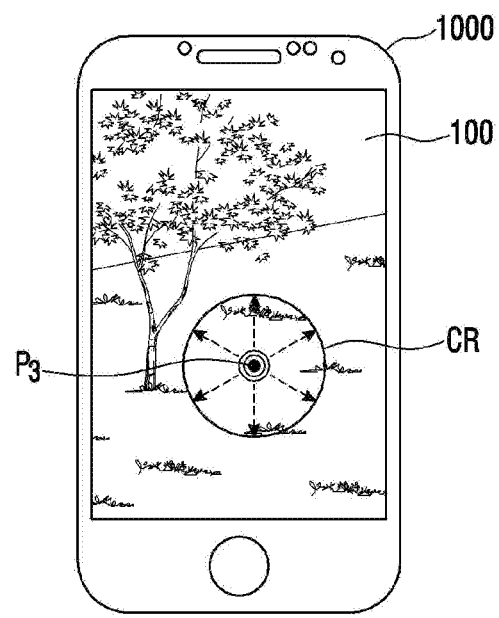
FIG. 16 is a drawing illustrating a screen selection type according to a tenth embodiment of the present invention.

FIG. 16 is a drawing illustrating a screen selection type according to a tenth embodiment in the device 1000 according to the present invention.

Referring to FIG. 16, the user U applies the third pressure touch P3 on the touch screen 100, and changes the magnitude of pressure of the pressure touch P3 to enlarge or reduce a selection area CR on the basis of the position at which the pressure touch P3 is applied on the touch screen 100. Here, the selection area CR may be enlarged or reduced in the concentric direction around the position at which the pressure touch P3 is applied. However, the present invention is not limited thereto, and the selection area may have an arbitrary shape enlarged or reduced around the position at which the pressure touch P3 is applied.

When the pressure touch P3 is released from the touch screen 100, the selection area CR may be confirmed and set. In addition, an image may be captured, deleted, or transmitted, etc. using the aforementioned various types for the set selection area CR.

In other words, the pressure touch P3 on the touch screen 100 is released to perform capturing, deletion, or transmission, etc. on the image in the selection area CR, or the pressure touch P3 on the touch screen 100 may be released and then a separate touch may be applied to the touch screen 100 to perform capturing, deletion, or transmission, etc. on the image in the selection area CR.

In the present embodiment, the control unit 200 may sense the position at which the pressure touch P3 is applied and the magnitude of a pressure of the pressure touch P3 to set the selection area, and may capture, delete, or transmit the image included in the selection area CR through various types of user operations.

The captured image may be stored in the memory 300, and the control unit 200 may read out the image stored in the memory 300 and display the image on the touch screen 100.

Figure 21:
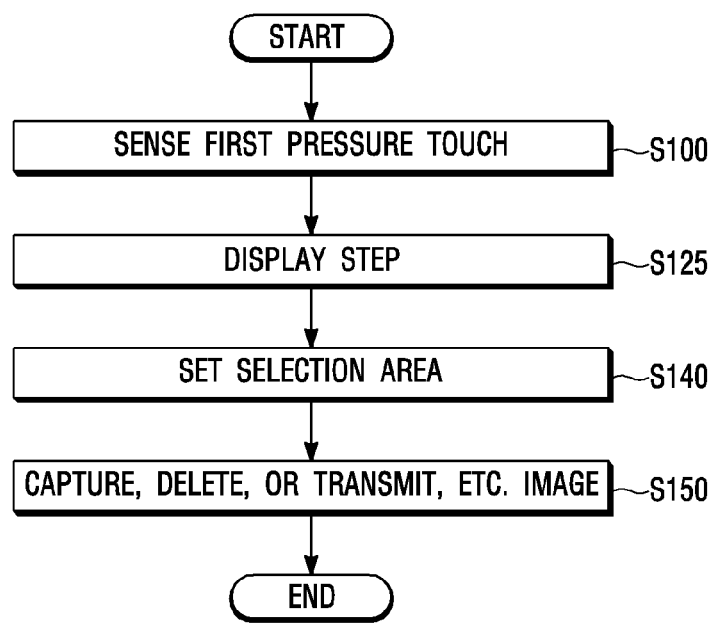
FIG. 21 is a flowchart illustrating a screen selection method according to a tenth embodiment of the present invention.

FIG. 21 is a flowchart of a screen selection method according to the present invention, which is related to the aforementioned tenth embodiment.

Referring to the flowchart illustrated in FIG. 21, the screen selection method according to the present invention, first, a pressure touch having a pressure of a prescribed magnitude or larger is sensed on the screen 100 (step S100). Then, a change in the magnitude of the pressure of the pressure touch P3 applied on the touch screen 100 is sensed, and the selection area CR may be enlarged or reduced to be displayed around the position at which the pressure touch P3 is applied (step S125).

Then, the selection area CR is confirmed and set (step S140), and the image included in the selection area CR may be captured, deleted, or transmitted, etc. (step S150). However, the performing capturing, deletion, or transmission on the image in the set selection area CR may be performed by means of various types of user operations, and such methods may correspond to the above-described methods.

In the aforementioned description, the release of the 3D touch may mean that the contact between the touch object (e.g. a user's finger or the like) and the touch screen 100 is released. However, the present invention is not limited thereto, and the description may also mean a case in which the contact between the touch object (e.g. the user's finger or the like) and the touch screen 100 is maintained, but the magnitude of the 3D touch is reduced to be smaller than a prescribed magnitude, namely, the 3D touch is changed to a 2D touch.

The features, structures and effects and the like described in the embodiments are included in at least one embodiment of the present invention and are not necessarily limited to one embodiment. Furthermore, the features, structures, effects and the like provided in each embodiment can be combined, changed, modified, converted, replaced, added, transformed, and applied by those skilled in the art to which the embodiments belong. Therefore, contents related to the combination, change, modification, conversion, replacement, and addition should be construed to be included in the scope of the present invention without departing from the spirit of the present invention.

DESCRIPTION OF REFERENCE NUMERALS

100: Touch screen
200: Control unit
300: Memory
400: Other units
1000: Device

The invention claimed is:

1. A method for selecting a screen on a touch screen using a pressure touch, comprising:
   a first pressure touch sensing step for sensing a first pressure touch having a pressure of a prescribed magnitude or higher, which is input through a touch screen;
   a scroll operation sensing step for sensing a scroll operation input through the touch screen after sensing the first pressure touch is sensed;
   a display step for scrolling and displaying a screen displayed on the touch screen according to the scroll operation;
   a second pressure touch sensing step for sensing a second pressure touch having a pressure of a prescribed magnitude or higher, which is input on the scrolled screen; and
   a selection area setting step for setting, as a selection area, an area defined by a position at which the first pressure touch is sensed and a position at which the second pressure touch is sensed;
   wherein, in the selection area setting step, an area defined as a quadrangle with a position at which the first pressure touch is sensed and a point at which the second pressure touch is sensed taken as vertices in a diagonal direction is set as the selection area.

2. The method for selecting a screen on a touch screen using a pressure touch of claim 1, further comprising:
   after the selection area setting step, an image capturing step for capturing an image included in the selection area.

3. The screen selection method using a pressure touch of claim 2, wherein, in the image capturing step, the image included in the selection area is captured at a time when the second pressure touch has a pressure of a preset magnitude or higher.

4. The screen selection method using a pressure touch of claim 2, wherein, in the image capturing step, when the second pressure touch is released, the image included in the selection area is captured.

5. The screen selection method using a pressure touch of claim 2, wherein, in the image capturing step, after the second pressure touch is released, a touch input on the touch screen is sensed to capture the image included in the selection area.

6. The screen selection method using a pressure touch of claim 2, wherein, in the image capturing step, after the second pressure touch is released, a third pressure touch of a prescribed magnitude or higher, which is input on the touch screen, is sensed to capture the image included in the selection area.

7. The screen selection method using a pressure touch of claim 2, further comprising:
   a selection area modifying step for changing a range of the selection area between the selection area setting step and the image capturing step.

8. The method for selecting a screen on a touch screen using a pressure touch of claim 2, wherein, in the image capturing step, while the second pressure touch is applied, a touch input on the touch screen is sensed to capture the image included in the selection area.

9. The method for selecting a screen on a touch screen using a pressure touch of claim 2, wherein, in the image capturing step, while the second pressure touch is applied, a fourth pressure touch of a prescribed magnitude or higher is sensed to capture the image included in the selection area.

10. The method for selecting a screen on a touch screen using a pressure touch of claim 2, wherein, in the image capturing step, after the second pressure touch is sensed, when the second pressure touch has a pressure magnitude smaller than a prescribed magnitude, the image included in the selection area is captured.

11. The screen selection method using a pressure touch of claim 8, further comprising:
   a selection area modifying step for changing a position at which the second pressure touch is applied to change a range of the selection area between the selection area setting step and the image capturing step.

12. The method for selecting a screen on a touch screen using a pressure touch of claim 1, wherein the scroll operation is a drag operation input on the touch screen.

13. A method for selecting a screen on a touch screen using a pressure touch, comprising:
   a first pressure touch sensing step for sensing a first pressure touch having a pressure of a prescribed magnitude or higher, which is input through a touch screen;
   a drag operation sensing step for sensing a drag operation input through the touch screen after sensing the first pressure touch is sensed;
   a display step for moving, according to the drag operation, a screen displayed on the touch screen in up and down directions or in left and right directions to display the moved screen;
   a second pressure touch sensing step for sensing a second pressure touch having a pressure of a prescribed magnitude or higher, which is input on the scrolled screen; and
   a selection area setting step for setting, as a selection area, an area defined by a position at which the first pressure touch is pressed and a position at which the second pressure touch is sensed;
   wherein, in the selection area setting step, an area defined as a quadrangle with a position at which the first pressure touch is sensed and a point at which the second pressure touch is sensed taken as vertices in a diagonal direction is set as the selection area.

14. The method for selecting a screen on a touch screen using a pressure touch of claim 13, further comprising:
   after the selection area setting step, an image capturing step for capturing an image included in the selection area.

15. The method for selecting a screen on a touch screen using a pressure touch of claim 13, wherein the drag operation is a drag operation using a tap touch input on the touch screen or a drag operation using a pressure touch input on the touch screen.

16. A method for selecting a screen on a touch screen using a pressure touch, comprising:
- a pressure touch sensing step for sensing a pressure touch having a pressure of a prescribed magnitude or higher, which is input through a touch screen;
- a display step for displaying an arbitrary area enlarged or reduced around a position at which the pressure touch is applied after the pressure touch is sensed, as a pressure magnitude of the pressure touch is changed; and
- a selection area setting step for confirming and setting, as a selection area, the arbitrary area displayed on the touch screen,
- an image capturing step for capturing an image included in the selection area after the selection area setting step;
- wherein, in the selection area setting step, the pressure touch on the touch screen is released to confirm and set the arbitrary area as the selection area;
- wherein, in the image capturing step, the pressure touch on the touch screen is released to capture the image in the selection area, or after the pressure touch on the touch screen is released, a separate touch is applied on the touch screen to capture the image in the selection area.

\* \* \* \* \*